(12) United States Patent
An et al.

(10) Patent No.: US 12,249,461 B2
(45) Date of Patent: Mar. 11, 2025

(54) MULTILAYER ELECTRONIC COMPONENT

(71) Applicant: SAMSUNG ELECTRO-MECHANICS CO., LTD., Suwon-si (KR)

(72) Inventors: So Jung An, Suwon-si (KR); Hyung Jong Choi, Suwon-si (KR); Yoo Jeong Lee, Suwon-si (KR); Chung Yeol Lee, Suwon-si (KR); Kwang Yeun Won, Suwon-si (KR); Woo Kyung Sung, Suwon-si (KR); Myung Jun Park, Suwon-si (KR); Jong Ho Lee, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 180 days.

(21) Appl. No.: 17/901,051

(22) Filed: Sep. 1, 2022

(65) Prior Publication Data

US 2023/0230770 A1 Jul. 20, 2023

(30) Foreign Application Priority Data

Dec. 31, 2021 (KR) ........................ 10-2021-0194176

(51) Int. Cl.
*H01G 4/224* (2006.01)
*H01G 4/232* (2006.01)
*H01G 4/30* (2006.01)

(52) U.S. Cl.
CPC ........... *H01G 4/224* (2013.01); *H01G 4/2325* (2013.01); *H01G 4/30* (2013.01)

(58) Field of Classification Search
None
See application file for complete search history.

(56) References Cited

U.S. PATENT DOCUMENTS

| | | | | |
|---|---|---|---|---|
| 2003/0099084 | A1* | 5/2003 | Duva | H01G 2/12 361/306.3 |
| 2004/0240146 | A1* | 12/2004 | Kayatani | H01G 2/103 361/306.3 |

(Continued)

FOREIGN PATENT DOCUMENTS

| | | | |
|---|---|---|---|
| JP | H06084687 | A1 * | 3/1994 |
| JP | 2016-178219 | A | 10/2016 |

(Continued)

OTHER PUBLICATIONS

KR-400 data sheet (Year: 2024).*

*Primary Examiner* — Eric W Thomas
(74) *Attorney, Agent, or Firm* — Morgan, Lewis & Bockius LLP

(57) ABSTRACT

A multilayer electronic component includes: a body having first and second surfaces opposing each other in a first direction, and third and fourth surfaces connected to first and second surfaces and opposing each other in a second direction; a first external electrode including a first connection portion disposed on the third surface, a first band portion extending from the first connection portion onto a portion of the first surface, and a third band portion extending from the first connection portion onto a portion of the second surface; a second external electrode including a second connection portion disposed on the fourth surface, and a second band portion extending from the second connection portion onto a portion of the first surface; an insulating layer including a silicone-based resin and disposed on the first and second connection portions.

33 Claims, 21 Drawing Sheets

(56) References Cited

U.S. PATENT DOCUMENTS

| | | | | |
|---|---|---|---|---|
| 2008/0297977 | A1* | 12/2008 | Togashi | H01G 4/232 |
| | | | | 361/306.3 |
| 2012/0188682 | A1* | 7/2012 | Sato | H01G 4/232 |
| | | | | 336/200 |
| 2012/0327555 | A1* | 12/2012 | Ahn | H01G 4/232 |
| | | | | 361/321.1 |
| 2013/0020913 | A1* | 1/2013 | Shirakawa | H01G 4/232 |
| | | | | 336/200 |
| 2013/0063862 | A1* | 3/2013 | Kim | H01G 4/30 |
| | | | | 156/182 |
| 2013/0187744 | A1* | 7/2013 | Seko | H01F 17/0013 |
| | | | | 336/200 |
| 2014/0204502 | A1* | 7/2014 | Chun | H01G 4/30 |
| | | | | 361/301.4 |
| 2015/0287532 | A1* | 10/2015 | Abe | H05K 3/3436 |
| | | | | 427/79 |
| 2016/0276104 | A1 | 9/2016 | Nishisaka et al. | |
| 2017/0271081 | A1* | 9/2017 | Maki | H01G 4/248 |
| 2017/0367187 | A1 | 12/2017 | Chae et al. | |
| 2018/0047484 | A1* | 2/2018 | Mori | H01C 7/008 |
| 2019/0096583 | A1* | 3/2019 | Sasaki | H01G 4/232 |
| 2019/0131076 | A1* | 5/2019 | Fukumura | H01G 4/232 |
| 2021/0183581 | A1* | 6/2021 | Nakano | H01G 4/1218 |

FOREIGN PATENT DOCUMENTS

| | | |
|---|---|---|
| KR | 10-2017-0084156 A | 7/2017 |
| KR | 10-2017-0143275 A | 12/2017 |

\* cited by examiner

MULTILAYER ELECTRONIC COMPONENT

CROSS-REFERENCE TO RELATED APPLICATION(S)

This application claims benefit of priority to Korean Patent Application No. 10-2021-0194176 filed on Dec. 31, 2021, in the Korean Intellectual Property Office, the disclosure of which is incorporated herein by reference in its entirety.

TECHNICAL FIELD

The present disclosure relates to a multilayer electronic component.

BACKGROUND

A multilayer ceramic capacitor (MLCC), a type of multilayer electronic component, is a chip-type condenser, mounted on the printed circuit boards of various types of electronic products, including image display devices, such as a liquid crystal display (LCD) and a plasma display panel (PDP), a computer, a smartphone, a mobile phone, and the like, serving to charge or discharge electricity.

Such a multilayer ceramic capacitor may be used as a component of various electronic devices due to advantages of a miniaturized size, and high capacitance as well as ease of mounting. As electronic devices such as computers and mobile devices are miniaturized and implemented with high output, demand for miniaturization and implementation of high capacitance in a multilayer ceramic capacitor are increasing.

In addition, in recent years, as industry interest in electronic products has increased, multilayer ceramic capacitors have been required to have high reliability and high strength characteristics to be used in automobiles and infotainment systems.

For miniaturization and high capacitance of a multilayer ceramic capacitor, it is required to maximize an effective area of an electrode (to increase an effective volume fraction required for implementing capacitance).

In addition, in order to mount as many components as possible within a limited area of the substrate, it is necessary to minimize a mounting space.

In addition, as a thickness of a margin decreases with miniaturization and high capacitance of the multilayer ceramic capacitor, permeation of external moisture or permeation of a plating solution may be facilitated, and thus reliability may be reduced. Accordingly, there is a need for a method capable of protecting the multilayer ceramic capacitor from the permeation of external moisture or the permeation of the plating solution.

SUMMARY

An aspect of the present disclosure is to provide a multilayer electronic component having improved capacitance per unit volume.

An aspect of the present disclosure is to provide a multilayer electronic component having improved reliability.

An aspect of the present disclosure is to provide a multilayer electronic component capable of minimizing a mounting space.

However, the object of the present disclosure is not limited to the above-described contents, and will be more easily understood in the course of describing specific embodiments of the present disclosure.

According to an aspect of the present disclosure, a multilayer electronic component, may include: a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, fifth and sixth surfaces connected to the first to fourth surfaces and opposing each other in a third direction; a first external electrode including a first connection portion disposed on the third surface, a first band portion extending from the first connection portion onto a first portion of the first surface, and a third band portion extending from the first connection portion onto a first portion of the second surface; a second external electrode including a second connection portion disposed on the fourth surface, a second band portion extending from the second connection portion onto a second portion of the first surface, and a fourth band portion extending from the second connection portion onto a second portion of the second surface; an insulating layer disposed on the first and second connection portions, and disposed to cover the second surface, and third and fourth band portions; a first plating layer disposed on the first band portion; and a second plating layer disposed on the second band portion, wherein the insulating layer may include a first silicone-based resin.

According to an aspect of the present disclosure, a multilayer electronic component, may include: a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, and a first band portion extending from the first connection portion onto a first portion of the first surface; a second external electrode including a second connection portion disposed on the fourth surface, and a second band portion extending from the second connection portion onto a second portion of the first surface; an insulating layer disposed on the second surface and disposed to extend onto the first and second connection portions; a first plating layer disposed on the first band portion; and a second plating layer disposed on the second band portion, wherein the insulating layer may include a first silicone-based resin.

According to an aspect of the present disclosure, a multilayer electronic component, may include: a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection portion disposed on the third surface, a first band portion extending from the first connection portion onto a first portion of the first surface, and a first corner portion disposed to extend from the first connection portion to a corner connecting the second and third surfaces; a second external electrode including a second connection portion disposed on the fourth surface, a second band portion extending from the second connection portion onto a second portion of the first surface, and a second corner portion disposed to extend from the second connection portion to a corner connecting the second and fourth surfaces; an insulating layer disposed on the first and second connection portions, and disposed to cover the second surface, and the first and second corner portions; a first plating layer disposed on the first band portion; and a second plating layer disposed on the second band portion, wherein, an average distance from an extension line of the third surface to an end of the first corner portion in the second direction is B3, an average distance from an extension line of the fourth surface to an end of the second corner portion in the second direction is B4, an average size of a region, in which the third surface and the second internal electrode are spaced apart from each other, in a second direction is G1, and an average size of a region, in which the fourth surface and the first internal electrode are spaced apart from each other, in the second direction is G2, B3≤G1 and B4≤G2 are satisfied, wherein the insulating layer may include a first silicone-based resin.

According to an aspect of the present disclosure, a multilayer electronic component, may include: a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode including a first connection electrode disposed on the third surface and a first band electrode disposed on the first surface and connected to the first connection electrode; a second external electrode including a second connection electrode disposed on the fourth surface and a second band electrode disposed on the first surface and connected to the second connection electrode; a first insulating layer disposed on the first connection electrode; a second insulating layer disposed on the second connection electrode; a first plating layer disposed on the first band electrode; and a second plating layer disposed on the second band electrode, wherein the first and second insulating layers may include a first silicone-based resin.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
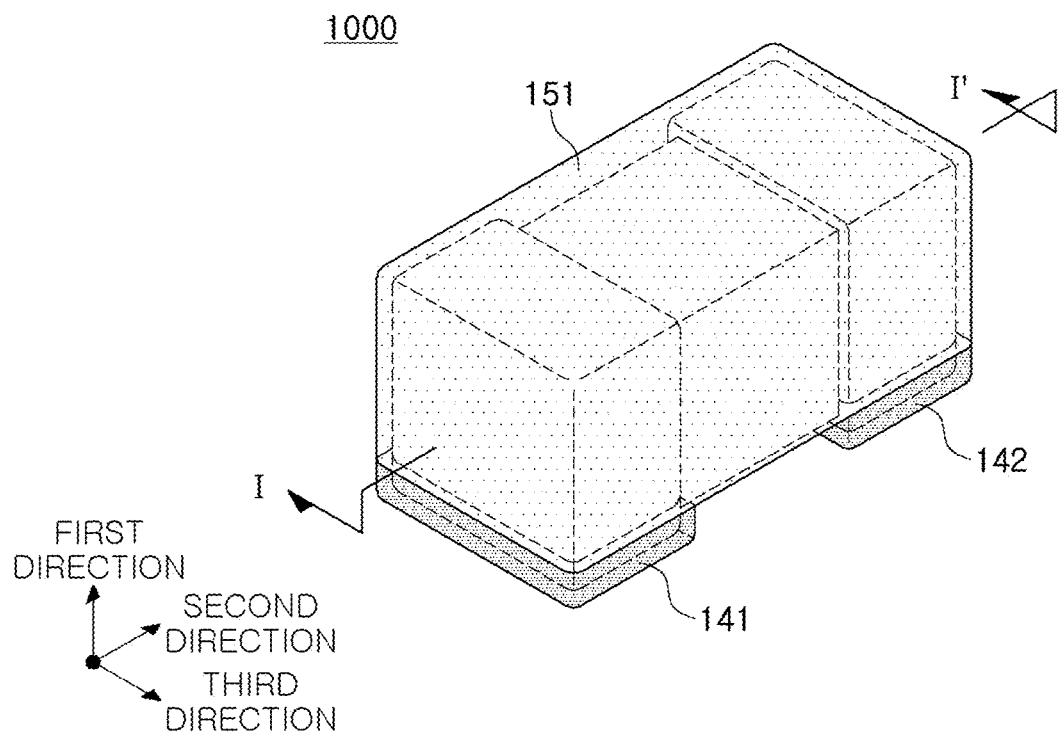
FIG. 1 schematically illustrates a perspective view of a multilayer electronic component according to an embodiment of the present disclosure.

Hereinafter, embodiments of the present disclosure will be described as follows with reference to the attached drawings. The present disclosure may, however, be exemplified in many different forms and should not be construed as being limited to the specific embodiments set forth herein.

Rather, these embodiments are provided so that this disclosure will be through and complete, and will fully convey the scope of the disclosure to those skilled in the art. Accordingly, shapes and sizes of elements in the drawings may be exaggerated for clarity of description, and elements indicated by the same reference numeral are same elements in the drawings.

In the drawings, irrelevant descriptions will be omitted to clearly describe the present disclosure, and to clearly express a plurality of layers and areas, thicknesses may be magnified. The same elements having the same function within the scope of the same concept will be described with use of the same reference numerals. Throughout the specification, when a component is referred to as "comprise" or "comprising," it means that it may include other components as well, rather than excluding other components, unless specifically stated otherwise.

In the drawings, a first direction may be defined as a stacking direction or a thickness (T) direction, a second direction may be defined as a length (L) direction, and a third direction may be defined as a width (W) direction.

FIG. 1 schematically illustrates a perspective view of a multilayer electronic component according to an embodiment of the present disclosure.

Figure 2:
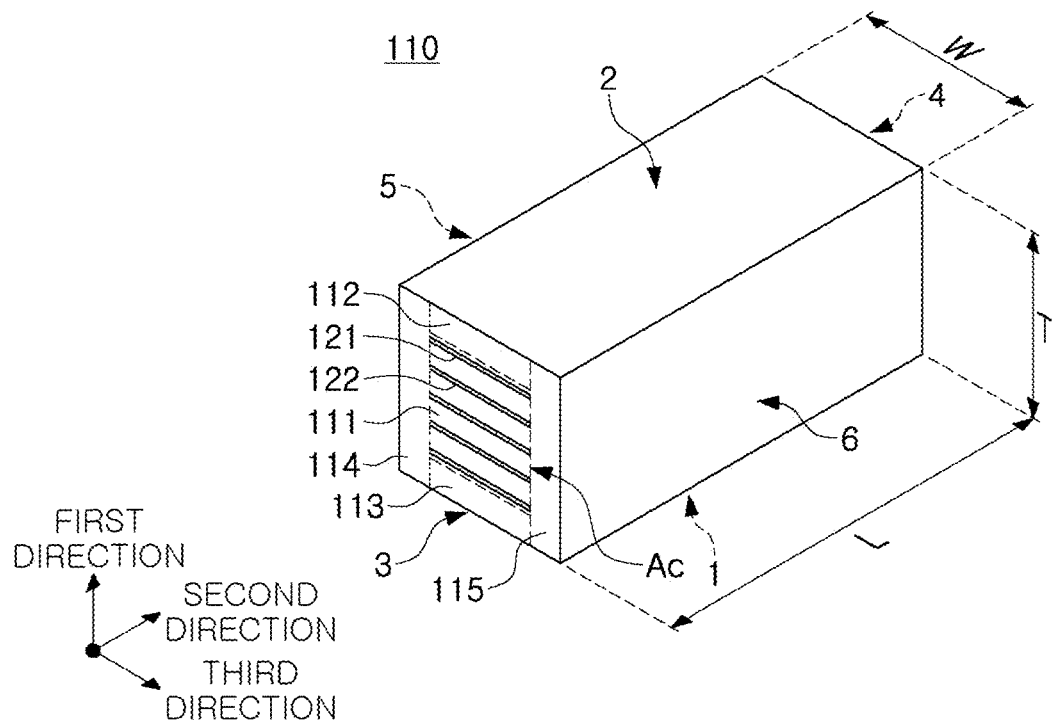
FIG. 2 schematically illustrates a perspective view of a body of the multilayer electronic component of FIG. 1.

FIG. 2 schematically illustrates a perspective view of a body of the multilayer electronic component of FIG. 1.

Figure 3:
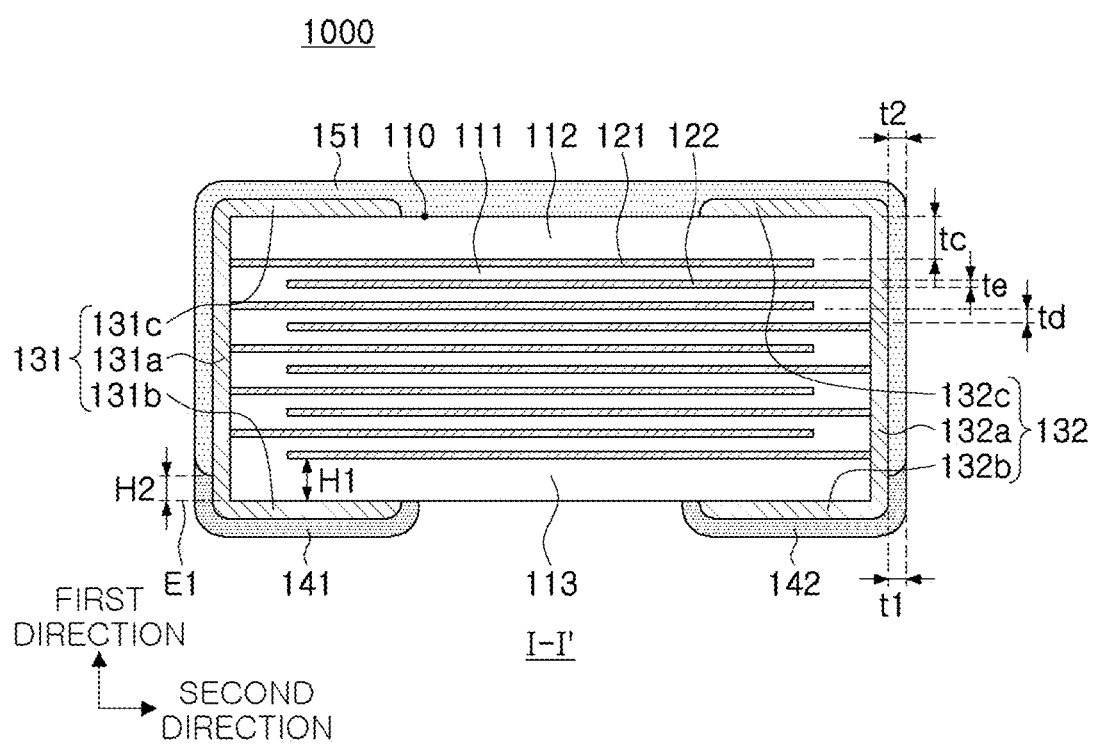
FIG. 3 is a cross-sectional view taken along line I-I' of FIG. 1.

FIG. 3 is a cross-sectional view taken along line I-I' of FIG. 1.

Figure 4:
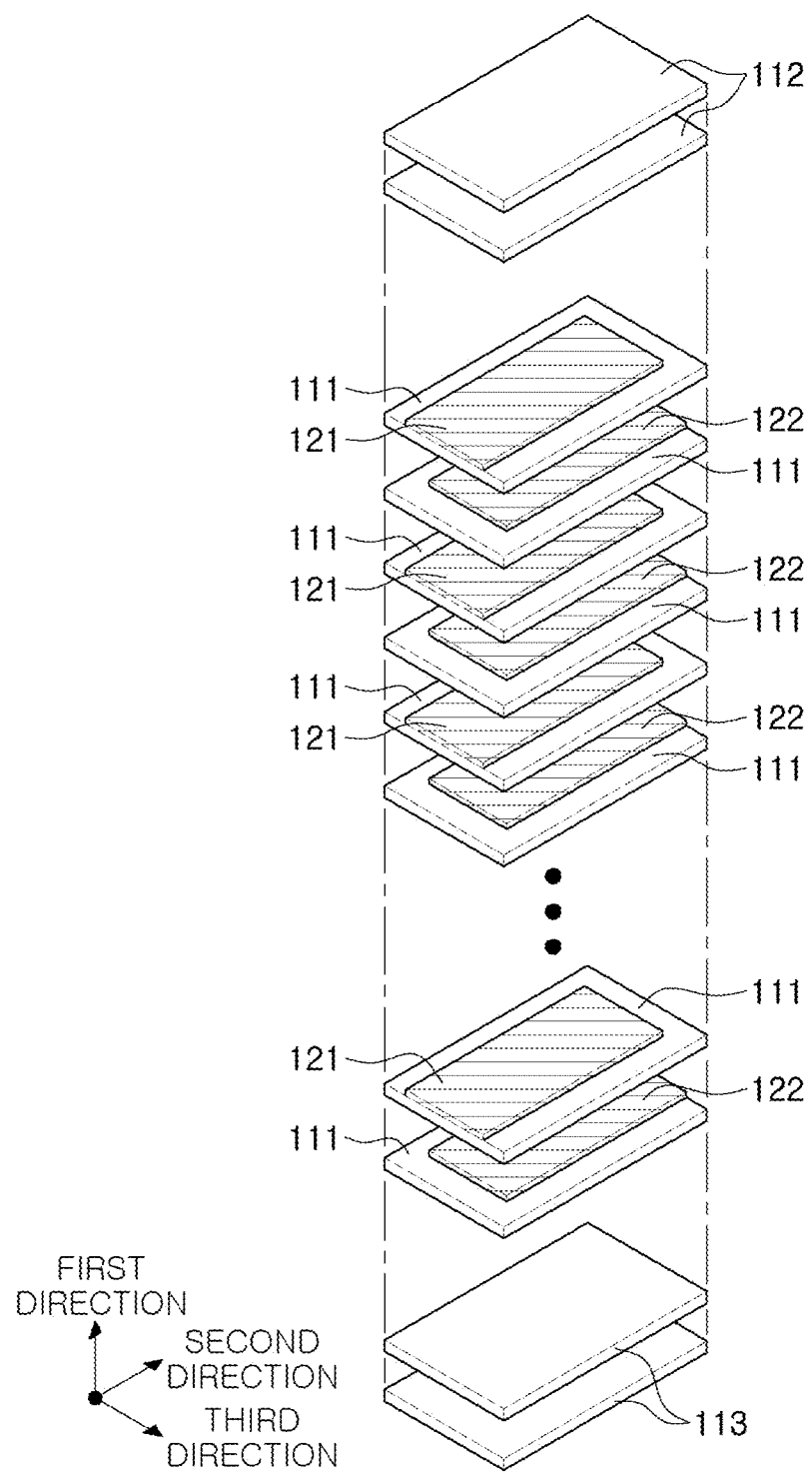
FIG. 4 is an exploded perspective view schematically illustrating an exploded body of FIG. 2.

FIG. 4 is an exploded perspective view schematically illustrating an exploded body of FIG. 2.

Figure 5:
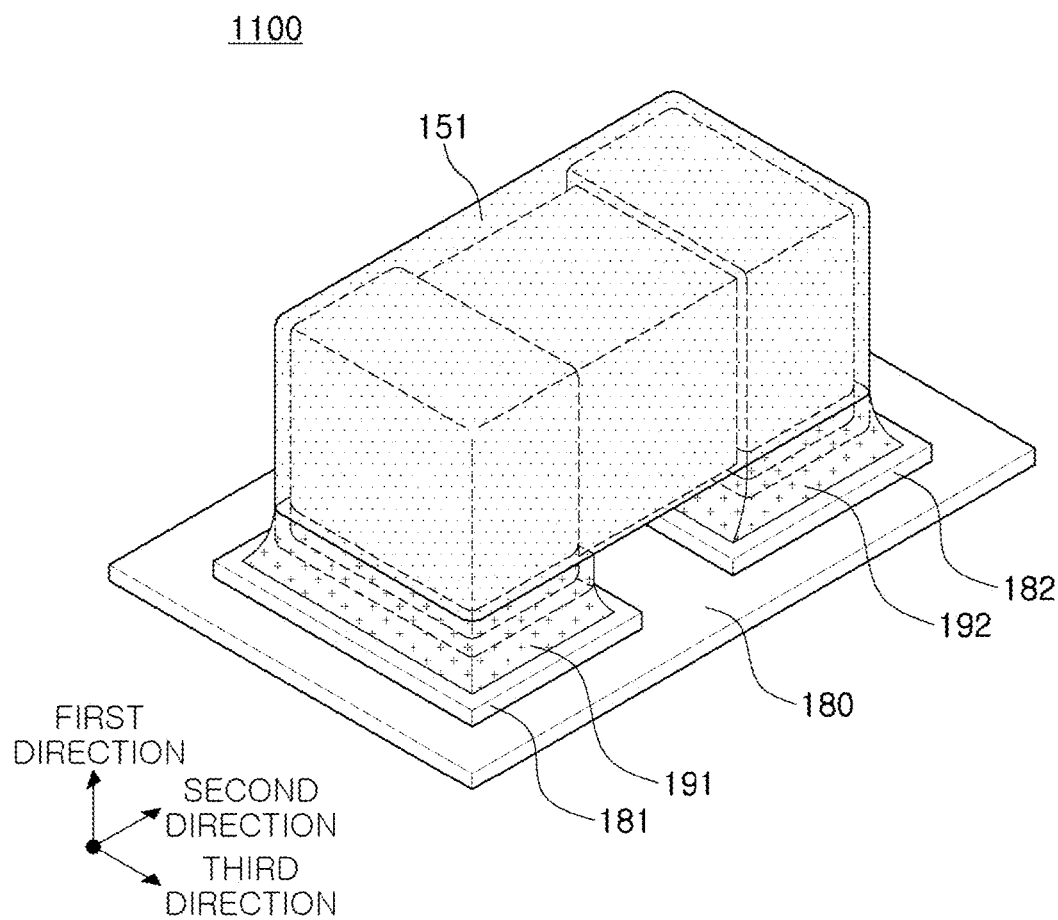
FIG. 5 is a schematic perspective view of a substrate on which the multilayer electronic component of FIG. 1 is mounted.

FIG. 5 is a schematic perspective view of a substrate on which the multilayer electronic component of FIG. 1 is mounted.

Hereinafter, a multilayer electronic component 1000 according to an embodiment of the present disclosure will be described with reference to FIGS. 1 to 5.

The multilayer electronic component 1000 according to an embodiment of the present disclosure may include a dielectric layer 111 and first and second internal electrodes 121 and 122 alternately disposed with the dielectric layer 111 interposed therebetween, the body 110 having first and second surfaces 1 and 2 opposing each other in a first direction, third and fourth surfaces 3 and 4 connected to the first and second surfaces and opposing each other in a second direction, and fifth and sixth surfaces 5 and 6 connected to the first to fourth surfaces and opposing each other in a third direction; a first external electrode 131 including a first connection portion 131a disposed on the third surface, a first band portion 131b extending from the first connection portion onto a portion of the first surface, and a third band portion 131c extending from the first connection portion onto a portion of the second surface; a second external electrode 132 including a second connection portion 132a disposed on the fourth surface, a second band portion 132b extending from the second connection portion onto a portion of the first surface, and a fourth band portion 132c extending from the second band portion onto a portion of the second surface; an insulating layer 151 disposed on the first and second connection portions, and disposed to cover the second surface, and the third and fourth band portions 131c and 132c; a first plating layer 141 disposed on the firsts band portion 131b; and a second plating layer 142 disposed on the second band portion 132b, wherein the insulating layer 151 may include a silicone-based resin.

The body 110 may have a dielectric layer 111 and internal electrodes 121 and 122, alternately laminated.

The specific shape of the body 110 is not particularly limited, but as illustrated, the body 110 may have a hexahedral shape, or a shape similar thereto. Due to shrinkage of ceramic powder included in the body 110 during a sintering process, the body 110 may have a substantially hexahedral shape, but may not have a hexahedral shape having completely straight lines.

The body 110 may have first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first and second surfaces 1 and 2, connected to the third and fourth surfaces 3 and 4 and opposing each other in a third direction.

In an embodiment, the body 110 may include a 1-3 corner connecting a first surface and a third surface, a 1-4 corner connecting the first surface and the fourth surface, a 2-3 corner connecting the second surface and the third surface, and a 2-4 corner connecting the second surface and the fourth surface. The 1-3 corner and the 2-3 corner may have a form contracted to a center of the body in a first direction, toward the third surface, and the 1-4 corners and the 2-4 corner may have a form contracted to a center of the body in a first direction, toward the fourth surface.

As a margin region in which the internal electrodes 121 and 122 is not disposed overlaps the dielectric layer 111, a step may be generated due a thickness of the internal electrodes 121 and 122, so that a corner connecting the first surface and the third to fifth surfaces and/or a corner connecting the second surface and the third to fifth surfaces may have a form contracted toward a center of the body 110, in the first direction when viewed with respect to the first surface or the second surface. Alternatively, a corner connecting the first surface 1 and the third to sixth surfaces 3, 4, 5, and 6 and/or a corner connecting the second surface 2 and the third to sixth surfaces 3, 4, 5, and 6 by shrinkage behavior in a sintering process of the body may have a form contracted toward the center of the body 110, in the first direction when viewed with respect to the first surface or the second surface. Alternatively, as a separate process is performed to round edges connecting each surface of the body 110 in order to prevent chipping defects, and/or the corner connecting the first surface and the third to sixth surfaces and/or the corner connecting the second surface and the third to sixth surfaces may have a rounded shape.

The corner may include a 1-3 corner connecting the first and third surfaces, a 1-4 corner connecting the first and fourth surfaces, a 2-3 corner connecting the second and third surfaces, and a 2-4 corner connecting the second and fourth surfaces. In addition, the corner may include a 1-5 corner connecting the first and fifth surfaces, a 1-6 corner connecting the first and sixth surfaces, a 2-5 corner connecting the second and fifth surfaces, and a 2-6 corner connecting the second and sixth surfaces. The first to sixth surfaces of the body 110 may be generally flat surfaces, and non-flat regions may be viewed as corners. Hereinafter, an extension line of each surface may mean a line extended based on a flat portion of each surface.

In this case, a region disposed on the corner of the body 110 among the external electrodes 131 and 132 may be referred to as a corner portion, a region disposed on the third and fourth surfaces of the body 110 may be referred to as a connection portion, and a region disposed on the first and second surfaces of the body may be referred to as a band portion.

In order to suppress the step portion formed by the internal electrodes 121 and 122, after the internal electrodes are cut so as to be exposed to the fifth and sixth surfaces 5 and 6 of the body after lamination, when the margin portions 114 and 115 are formed by stacking a single dielectric layer or two or more dielectric layers on both side surfaces of the capacitance formation portion Ac in a third direction (width direction), a portion connecting the first surface and the fifth and sixth surfaces and a portion connecting the second surface and the fifth and sixth surfaces may not have a contracted form.

The plurality of dielectric layers 111 forming the body 110 are in a sintered state, and a boundary between adjacent dielectric layers 111 may be integrated, such that it may be difficult to confirm without using a scanning electron microscope (SEM).

According to an embodiment of the present disclosure, a raw material for forming the dielectric layer 111 is not particularly limited, as long as sufficient electrostatic capacitance may be obtained therewith. For example, the raw material for forming the dielectric layer 111 may be a barium titanate ($BaTiO_3$)-based a material, lead composite perovskite-based material, a strontium titanate ($SrTiO_3$)-based material, or the like. The barium titanate-based material may include $BaTiO_3$-based ceramic powder, and the ceramic powder may be, for example, $BaTiO_3$, $(Ba_{1-x}Ca_x)TiO_3$, $Ba(Ti_{1-y}Ca_y)O_3$, $(Ba_{1-x}Ca_x)(Ti_{1-y}Zr_y)O_3$ or $Ba(Ti_{1-y}Zr_y)O_3$, in which calcium (Ca), zirconium (Zr), or the like, are partially dissolved in $BaTiO_3$, and the like.

In addition, various ceramic additives, organic solvents, plasticizers, binders, dispersants, and the like, may be added according to the purpose of the present disclosure.

Meanwhile, an average thickness td of the dielectric layer 111 is not particularly limited.

However, in general, when the dielectric layer is formed to have a thickness of less than 0.6 μm, in particular, when the thickness of the dielectric layer is 0.35 μm or less, there was a concern that reliability may be deteriorated.

According to an embodiment of the present disclosure, by disposing the insulating layer on a connection portion of the external electrode, and the plating layer on a band portion of the external electrode, it is possible to prevent permeation of external moisture and permeation of a plating solution to improve reliability, so that excellent reliability can be secured even when an average thickness of the dielectric layer 111 is 0.35 μm or less.

Accordingly, when the average thickness of the dielectric layer 111 is 0.35 μm or less, an effect of improving the reliability according to the present disclosure may be more remarkably improved.

The average thickness td of the dielectric layer 111 may mean an average thickness of the dielectric layer 111 disposed between the first and second internal electrodes 121 and 122.

The average thickness of the dielectric layer 111 may be measured by scanning an image of a cross-section of the body 110 in length and thickness directions (L-T directions) with a scanning electron microscope (SEM) with a magnification of 10,000. More specifically, an average value may be measured by measuring a thickness of one dielectric layer at 30 points positioned at equal intervals in the length direction from the scanned image. The 30 points positioned at equal intervals may be designated in the capacitance formation portion Ac. In addition, if the average value is measured by extending the average value measurement to 10 dielectric layers, the average thickness of the dielectric layers can be more generalized.

The body 110 may include a capacitance formation portion Ac disposed in the body 110, and including a first internal electrode 121 and a second internal electrode 122 disposed to oppose each other with the dielectric layer 111 interposed therebetween and having capacitance formed therein, and cover portions 112 and 113 formed above and below the capacitance formation portion Ac in the first direction.

In addition, the capacitance formation portion Ac is a portion serving to contribute to capacitance formation of a capacitor, and may be formed by repeatedly laminating a plurality of first and second internal electrodes 121 and 122 with a dielectric layer 111 interposed therebetween.

The cover portions 112 and 113 may include an upper cover portion 112 disposed above the capacitance formation portion Ac in the first direction, and a lower cover portion 113 disposed below the capacitance formation portion Ac in the first direction.

The upper cover portion 112 and the lower cover portion 113 may be formed by laminating a single dielectric layer or two or more dielectric layers on the upper and lower surfaces of the capacitance portion Ac in a thickness direction, respectively, and the upper cover portion 112 and the lower cover portion 113 may serve to basically prevent damage to the internal electrodes due to physical or chemical stress.

The upper cover portion 112 and the lower cover portion 113 may not include internal electrodes, and may include the same material as that of the dielectric layer 111.

That is, the upper cover portion 112 and the lower cover portion 113 may include a ceramic material, for example, a barium titanate ($BaTiO_3$)-based ceramic material.

Meanwhile, an average thickness of the cover portions 112 and 113 need not be particularly limited. However, an average thickness tc of the cover portions 112 and 113 may be 15 μm or less in order to more easily achieve miniaturization and high capacitance of the multilayer electronic component. In addition, according to an embodiment of the present disclosure, by disposing the insulating layer on a connection portion of the external electrode, and disposing the plating layer on a band portion of the external electrode, since permeation of external moisture, permeation of a plating solution, and the like, may be prevented, reliability may be improved, so that excellent reliability may be secured even when the average thickness "tc" of the cover portions 112 and 113 are 15 μm or less.

The average thickness "tc" of the cover portions 112 and 113 may mean a size thereof in the first direction, and may be a value obtained by averaging sizes of the cover portions 112 and 113 measured in the first direction at five points having equal intervals above or below the capacitance formation portion Ac. For example, the measurements may be taken by scanning the cross-section of the body 110 using a scanning electron microscope (SEM). Other methods and/or tools appreciated by one of ordinary skill in the art, even if not described in the present disclosure, may also be used.

In addition, margin portions 114 and 115 may be disposed on a side surface of the capacitance formation portion Ac.

The margin portions 114 and 115 may include a first margin portion 114 disposed on the fifth surface 5 of the body 110 and a second margin portion 115 disposed on the sixth surface 6 thereof. That is, the margin portions 114 and 115 may be disposed on both end surfaces of the body in a width direction.

The margin portions 114 and 115 may mean a region between both ends of the first and second internal electrodes 121 and 122 and an interface of the body 110 in a cross-section cut of the body 110 in a width-thickness (W-T) direction, as illustrated in FIG. 3.

The margin portions 114 and 115 may basically serve to prevent damages to the internal electrodes due to physical or chemical stresses.

The margin portions 114 and 115 may be formed by applying a conductive paste to the ceramic green sheet, except for places margin portions are to be formed, to form an internal electrode.

In addition, in order to suppress a step by the internal electrodes 121 and 122, after the internal electrodes are cut so as to be exposed to the fifth and sixth surfaces 5 and 6 of the body after lamination, the margin portions 114 and 115 may also be formed by laminating a single dielectric layer or two or more dielectric layers on both side surfaces of the capacitance formation portion Ac in the third direction (width direction).

Meanwhile, a width of the margin portions 114 and 115 is not particularly limited. However, in order to more easily implement miniaturization and high capacitance of the multilayer electronic component, an average width of the margin portions 114 and 115 may be 15 µm or less. In addition, according to an embodiment of the present disclosure, by disposing an insulating layer on a connection portion of the external electrode and a plating layer on a band portion of the external electrode, since reliability may be improved by preventing permeation of external moisture, permeation of a plating solution, and the like, excellent reliability may be secured even when the average thickness of the margin portions 114 and 115 is 15 µm or less.

The average width of the margin portions 114 and 115 may mean an average size of the margin portions 114 and 115 in a third direction, and may be a value obtained by averaging the margin portions 114 and 115 measured at five points at equal intervals in the third direction in terms of the capacitance formation portion Ac. For example, the measurements may be taken by scanning the cross-section of the body 110 using a scanning electron microscope (SEM). Other methods and/or tools appreciated by one of ordinary skill in the art, even if not described in the present disclosure, may also be used.

Internal electrodes 121 and 122 are alternately stacked with the dielectric layer 111.

The internal electrodes 121 and 122 may include first and second internal electrodes 121 and 122. The first and second internal electrodes 121 and 122 may be alternately disposed to face each other with the dielectric layer constituting the body 110 interposed therebetween, and may be exposed to the third and fourth surfaces 3 and 4 of the body 110, respectively.

Referring to FIG. 3, the first internal electrode 121 may be spaced apart from the fourth surface 4 and exposed through the third surface 3, and the second internal electrode 122 may be spaced apart from the third surface 3 and exposed through the fourth surface 4. A first external electrode 131 may be disposed on the third surface 3 of the body to be connected to the first internal electrode 121, and a second external electrode 132 may be disposed on the fourth surface 4 of the body to be connected to the second internal electrode 122.

That is, the first internal electrode 121 is not connected to the second external electrode 132, but is connected to the first external electrode 131, and the second internal electrode 122 is not connected to the first external electrode 131, but is connected to the second external electrode 132. Accordingly, the first internal electrode 121 may be formed to be spaced apart from the fourth surface 4 by a predetermined distance, and the second internal electrode 122 may be formed to be spaced apart from the third surface 3 by a predetermined distance.

In this case, the first and second internal electrodes 121 and 122 may be electrically isolated from each other by the dielectric layer 111 disposed therebetween.

The body 110 may be formed by alternately laminating a ceramic green sheet on which the first internal electrode 121 is printed and a ceramic green sheet on which the second internal electrode 122 is printed, followed by sintering.

A material for forming the internal electrodes 121 and 122 are not particularly limited, and a material having excellent electrical conductivity may be used. For example, the internal electrodes 121 and 122 may include at least one of nickel (Ni), copper (Cu), palladium (Pd), silver (Ag), gold (Au), platinum (Pt), tin (Sn), tungsten (W), titanium (Ti), and alloys thereof.

In addition, the internal electrodes 121 and 122 may be formed by printing a conductive paste for the internal electrodes including at least one of nickel (Ni), copper (Cu), palladium (Pd), silver (Ag), gold (Au), platinum (Pt), tin (Sn), tungsten (W), titanium (Ti) and an alloy thereof on a ceramic green sheet. A method for printing the conductive paste for the internal electrodes may be a screen printing method or a gravure printing method, but the present disclosure is not limited thereto.

Meanwhile, an average thickness "the" of the internal electrodes 121 and 122 does not need to be particularly limited.

However, in general, when the internal electrode is thinly formed to have a thickness of less than 0.6 µm, in particular, when the thickness of the internal electrode is 0.35 µm or less, there is a concern that reliability may be deteriorated.

According to an embodiment of the present disclosure, by disposing an insulating layer on a connection portion of the external electrode, and a plating layer on a band portion of the external electrode, since permeation of external moisture, moisture of a plating solution, and the like, may be prevented to improve reliability, even when the average thickness of the internal electrodes 121 and 122 are 0.35 µm or less, excellent reliability may be secured.

Accordingly, when the internal electrodes 121 and 122 have an average thickness of 0.35 µm or less, an effect according to the present disclosure may be more remarkable, and miniaturization and high capacitance of the multilayer electronic component may be more easily achieved.

The average thickness "the" of the internal electrodes 121 and 122 may mean an average thickness of the internal electrodes 121 and 122.

The average thickness of the internal electrodes 121 and 122 may be measured by scanning an image of a cross-section of the body 110 in length and thickness directions (L-T directions) with a scanning electron microscope (SEM) with a magnification of 10,000. More specifically, an average value may be measured by measuring a thickness of one internal electrode at 30 points positioned at equal intervals in the length direction from the scanned image. The 30 points having equal intervals may be designated in the capacitance formation portion Ac. In addition, if the average value is measured by extending the average value measurement to 10 internal electrodes, the average thickness of the internal electrodes can be more generalized.

External electrodes 131 and 132 may be disposed on the third surface 3 and the fourth surface 4 of the body 110. The external electrodes 131 and 132 may include first and second external electrodes 131 and 132 respectively disposed on the third and fourth surfaces 3 and 4 of the body 110, to be respectively connected to the first and second internal electrodes 121 and 122.

The external electrodes 131 and 132 may include a first external electrode 131 including a first connection portion 131a disposed on the third surface and a first band portion 131b extending from the first connection portion onto a portion of the first surface, and a second external electrode 132 including a second connection portion 132a disposed on the fourth surface and a second band portion 132b extending from the second connection portion onto a portion of the first surface. The first connection portion 131a may be connected to the first internal electrode 121 on the third surface, and the second connection portion 132a may be connected to the second internal electrode 122 on the fourth surface.

In addition, the first external electrode 131 may include a third band portion 131c extending from the first connection portion 131a onto a portion of the second surface, and the second external electrode 132 may include a fourth band portion 132c extending from the second connection portion 132a onto a portion of the second surface. Furthermore, the first external electrode 131 may include a first side band portion extending from the first connection portion 131a onto portions of the fifth and sixth surfaces, and the second external electrode 132 may include a second side band portion extending from the second connection portion 132a onto portions of the fifth and sixth surfaces.

However, the third band portion, the fourth band portion, the first side band portion, and the second side band portion may not be essential components of the present disclosure. The first and second external electrodes 131 and 132 may not be disposed on the second surface, and may not be disposed on the fifth and sixth surfaces. As the first and second external electrodes 131 and 132 are not disposed on the second surface, the first and second external electrodes 131 and 132 may be disposed below an extension line of the second surface of the body. In addition, the first and second connection portions 131a and 132a may be disposed to be spaced apart from the fifth and sixth surfaces, and the first and second connection portions 131a and 132a may be disposed to be spaced apart from the second surface. In addition, the first and second band portions 131b and 132b may also be disposed to be spaced apart from the fifth and sixth surfaces.

Meanwhile, when the first and second external electrode 131 and 132 include third and fourth band portions 131c and 132c, an insulating layer is disposed on the third and fourth band portions 131c an 132c, but an embodiment of the present disclosure is not limited thereto, and in order to improve ease of mounting. In addition, the first and second external electrodes 131 and 132 may include the third and fourth band portions 131c and 132c, but may not include a side band portion. In this case, the first and second connection portions 131a and 132a and the first to fourth band portions 131b, 132b, 131c, and 132c may have a form spaced apart from the fifth and sixth surfaces.

In the present embodiment, a structure in which the multilayer electronic component 1000 has two external electrodes 131 and 132 is described. However, the number and shape of the external electrodes 131 and 132 may be changed according to the shape of the internal electrodes 121 and 122 or other purposes.

Meanwhile, the external electrodes 131 and 132 may be formed using any material as long as they have electrical conductivity, such as metal, and a specific material may be determined in consideration of electrical characteristics and structural stability, and furthermore, may have a multilayer structure.

The external electrodes 131 and 132 may be firing electrodes including a conductive metal and glass, or resin-based electrodes including a conductive metal and glass.

In addition, the external electrodes 131 and 132 may have a form in which a firing electrode and a resin-based electrode are sequentially formed. In addition, the external electrodes 131 and 132 may be formed by transferring a sheet including a conductive metal onto the body, or may be formed by transferring a conductive metal onto the firing electrode.

As the conductive metal included in the external electrodes 131 and 132, a material having excellent electrical conductivity may be used, but is not particularly limited. For example, the conductive metal may be at least one of Cu, Ni, Pd, Ag, Sn, Cr, and alloys thereof. Preferably, the electrode layers 131 and 132 may include at least one of Ni and a Ni alloy, and accordingly, connectivity with the internal electrodes 121 and 122 including Ni can be further improved.

The insulating layer 151 may be disposed on first and second connection portions 131a and 132a.

Since the first and second connection portions 131a and portions connected to the internal electrodes 121 and 122, the first and second connection portions 131a and 132a may be paths for permeation of a plating solution in a plating process, or permeation of moisture during actual use. In the present disclosure, since the insulating layer 151 is disposed on the connection portions 131a and 132a, permeation of external moisture or permeation of the plating solution may be prevented.

The insulating layer 151 may be disposed to be in contact with the first and second plating layers 141 and 142. In this case, the insulating layer 151 may be in contact thereto to partially cover ends of the first and second plating layers 141 and 142, and may be in contact thereto to partially so that the first and second plating layers 141 and 142 partially cover an end of the insulating layer 151.

The insulating layer 151 may be disposed on the first and second connection portions 131a and 132a, and may be disposed to cover the second surface, and the third and fourth band portions 131c and 132c. In this case, the insulating layer 151 may be disposed to cover a region of the second surface, in which the third and fourth band portions 131c and 132c are not disposed. Accordingly, the insulating layer 151 may cover a region in which an end of the third and fourth band portions 131c and 132c and the body 110 are in contact, to block a moisture permeation path, thereby further improving moisture resistance reliability.

The insulating layer 151 may be disposed on the second surface to extend to the first and second connection portions 131a and 132a. In addition, when the external electrodes 131 and 132 are not disposed on the second surface, the insulating layer may be disposed to entirely cover the second surface. Meanwhile, the insulating layer 151 does not necessarily have to be disposed on the second surface, the insulating layer may not be disposed on a portion or an entirety of the second surface, and the insulating layer may be separated into two and respectively disposed on the first and second connection portions 131a and 132a. When the insulating layer is not disposed on the entirety of the second surface, the insulating layer may be disposed below n extension line of the second surface. In addition, although the insulating layer is not disposed on the second surface, it may extend from the first and second connection portions 131a and 132a to the fifth and sixth surfaces to form one insulating layer.

Furthermore, the insulating layer 151 may be disposed to cover the first and second side band portions, and portions of the fifth and sixth surfaces. In this case, the portions of the fifth and sixth surfaces, which are not covered by the insulating layer 151, may be exposed externally.

In addition, the insulating layer 151 may be disposed to cover all of the first and second side band portions, the fifth surface, and the sixth surface, and in this case, since the fifth and sixth surfaces are not exposed externally, moisture resistance reliability may be improved, and the connection portions 131a and 132a may also not be directly exposed externally, so that the reliability of the multilayer electronic component 1000 may be improved. In more detail, the insulating layer may cover both the first and second side band portions, and cover all regions of the fifth and sixth surfaces except for a region in which the first and second side band portions are formed.

The insulating layer 151 may serve to prevent the plating layers 141 and 142 from being formed on the external electrodes 131 and 132 on which the insulating layer 151 is disposed, and improve sealing characteristics to prevent moisture, a plating solution, or the like, from the outside.

The insulating layer 151 may include a silicone-based resin (a first silicone-based resin).

Conventionally, a glass-based material is generally used for an insulating layer, but due to characteristics of the glass-based material, it is difficult to form a uniform film due to agglomeration during sintering, and since heat is required during the sintering process, stress in a body is generated, which can cause cracks or delamination. In addition, when an insulating layer including a glass-based material is used, a method of sintering an insulating layer including a glass-based material after sintering an external electrode is used, but in a process of sintering the insulating layer, a metal material of the external electrode diffuses to the internal electrode, which may cause radiation cracks. Furthermore, since the glass-based material generally has a hard characteristic, there is a risk that it may be broken even by a small impact.

In the present disclosure, by applying a silicone-based resin instead of a glass-based material to the insulating layer, an attempt was made to solve the problem of the glass-based insulating layer.

The silicone-based resin may mean a thermosetting synthetic resin made by polymerization of an organic derivative of silicone. Since the silicone-based resin may be cured at 400° C. or lower, which is a relatively lower temperature than the glass-based sintering temperature, cracks due to thermal contraction, radiation cracks caused by metal diffusion, and the like can be suppressed. In addition, the silicone-based resin has excellent bonding strength with the body, and in particular, when a hydroxyl group is formed on a surface of the body, the resin may be deposited by easily bonding with a hydroxyl group, thereby further improving bonding strength with the body. In addition, the acrylic-based resin and the epoxy-based resin are difficult to form an insulating layer by vapor deposition and liquid deposition methods, but the silicone-based resin have an advantage of being easily formed by vapor deposition and liquid deposition, so various forming methods can be applied thereto.

In addition, the silicon-based resin may include a siloxane bond (Si—O bond) in which a silicon (Si) atom and an oxygen (O) atom are bonded. Accordingly, the silicone-based resin may exhibit excellent heat resistance, chemical resistance, high durability, and the like.

In general resins such as an acrylic-based resin and an epoxy-based resin, carbon is a backbone of the composition, but a molecular structure of silicone-based resin may be a structure in which a methyl group, a phenyl group, a hydroxy group, and the like are added to the siloxane bond (Si—O bond) as a backbone.

Whether the silicone-based resin includes a siloxane bond (Si—O bond) may be confirmed by whether a peak of the siloxane bond (Si—O bond) appears when analyzing FT-IR, GC-MS (gas chromatograph-mass spectrometer), and the like.

In an embodiment, the silicone-based resin may include a methyl group ($-CH_3$). Since the silicone-based resin includes a methyl group, heat resistance can be remarkably improved, so that the multilayer electronic component 1000 can be used in a high-temperature environment and high-temperature reliability can be improved.

Meanwhile, a content of the silicone-based resin included in the insulating layer 151 does not need to be particularly limited, but may be, for example, 10 wt or more. If the content of the silicone-based resin is less than 10 wt %, there is a concern that it is vulnerable to external impacts. On the other hand, an upper limit of the content of the silicone-based resin included in the insulating layer 151 does not need to be particularly limited, and the insulating layer 151 may be formed of a silicone-based resin except for impurities.

In an embodiment, the insulating layer 151 may include, as a ceramic additive, at least one selected from $TiO_2$, $BaTiO_3$, $Al_2O_3$, $SiO_2$, BaO in addition to the silicon-based resin. Since the ceramic additive has excellent bonding strength with a dielectric material included in the body 110 and glass included in the external electrodes 131 and 132, the bonding strength with the body 110 and the external electrodes 131 and 132 may be improved.

In this case, a content of the ceramic additive may be 10 wts or less (excluding 0 wts). When the content of the ceramic additive exceeds 10 wt %, it may be vulnerable to external impact, and the strength of the multilayer electronic component may be lowered.

A method of forming the insulating layer 151 does not need to particularly limited. For example, the insulating layer 151 may be formed by forming the external electrodes 131 and 132 on the body 110, and then printing a silicone-based resin, manufacturing a silicone-based resin into a sheet and transferring the same, or dipping it into a paste including a silicone-based resin to form an insulating layer 151. Furthermore, since the silicone-based resin is easily formed by vapor deposition and liquid deposition, the insulating layer 151 may be formed by vapor deposition and liquid deposition. In addition, one or more of the above methods may be applied to form the insulating layer 151.

In an embodiment, the insulating layer 151 may be disposed to be in direct contact with first and second external electrodes 131 and 132, and the first and second external electrodes 131 and 132 may include a conductive metal and glass. Accordingly, since the plating layers 141 and 142 may not be disposed among outer surfaces of the first and second external electrodes 131 and 132, erosion of external electrodes by a plating solution may be effectively suppressed.

In this case, the first plating layer 141 may be disposed to cover an end disposed on the first external electrode 131 of the insulating layer 151, and the second plating layer 142 may be disposed to cover an end disposed on the second external electrode 132 of the insulating layer 151. By forming the insulating layer 151 before forming the plating layers 141 and 142 on the external electrodes 131 and 132, permeation of the plating solution during a process of forming the plating layer can be more reliably suppressed.

As an insulating layer is formed before plating layers, the plating layers 141 and 142 may have a shape covering an end of the insulating layer 151. Since a silicone-based resin has excellent water repellency, unlike a glass-based resin, an acrylic-based resin, an epoxy-based resin, and the like, by forming the insulating layer 151 first, permeation of the plating solution may be effectively prevented during the plating process.

In an embodiment, the insulating layer 151 may be disposed to be in direct contact with first and second external electrodes 131 and 132, and the first and second external electrodes 131 and 132 may include a conductive metal and a resin. Accordingly, since plating layers 141 and 142 may not be disposed in a region in which the insulating layer 151 is disposed among outer surfaces of the first and second external electrodes 131 and 132, erosion of the external electrodes by a plating solution may be effectively suppressed.

In this case, the first plating layer 141 may be disposed to cover an end disposed on the first external electrode 131 of the insulating layer 151, and the second plating layer 142 may be disposed to cover an end disposed on the second external electrode 132 of the insulating layer 151. By forming the insulating layer 151 before forming the plating layers 141 and 142 on the external electrodes 131 and 132, permeation of a plating solution during a process of forming the plating layer may be more reliably suppressed. As the insulating layer is formed before forming the plating layer, the plating layers 141 and 142 may have a shape covering the end of the insulating layer 151. Since the silicone-based resins have excellent water repellency unlike the glass-based resin, the acrylic-based resin, and the epoxy-based resin, by forming the insulating layer 151 first, permeation of the plating solution can be effectively prevented during the plating process.

In an embodiment, an average thickness t2 of the insulating layer 151 may be 20 nm or more and 2 μm or less.

The glass-based insulating layer should be formed to have a minimum thickness of several ums, but in the case of an insulating layer using a silicone-based resin, a thickness thereof can be easily adjusted from several nms to several ums. In addition, an acrylic-based resin and epoxy-based resin are difficult to form an insulating layer by vapor deposition and liquid deposition methods, but a silicon-based resin can be used to form an insulating layer by vapor deposition and liquid deposition. Therefore, if the silicone-based resin is used, the insulating layer can be formed thin, and since the silicone-based resin has excellent water repellency, sufficient moisture resistance reliability can be secured when an average thickness t2 of the insulating layer 151 is 20 nm or more. When the average thickness t2 of the insulating layer 151 is less than 20 nm, there is a concern that an effect of suppressing cracks due to thermal contraction, radiation cracks caused by metal diffusion, and the like, and an effect of improving moisture resistance reliability may not be sufficiently secured.

On the other hand, when the average thickness t2 of the insulating layer 151 exceeds 2 μm, an overall size of the multilayer electronic component increases, so that the capacitance per unit volume may decrease.

The average thickness t2 of the insulating layer 151 may be a value obtained by averaging thicknesses measures at five points spaced apart at equal intervals on the insulating layer 151 disposed on the first and second connection portions 131a and 132a. As a more specific example, the average thickness t2 of the insulating layer 151 may be a value obtained by averaging the values of thicknesses of insulating layers measured at locations corresponding to a central point of the first and second connection portions 131a and 132a in a first direction, two points spaced apart by 5 μm in the first direction based on the central point in the first direction, two points spaced apart by 10 μm in the first direction. For example, the measurements may be taken by scanning the cross-section of the body 110 using a scanning electron microscope (SEM). Other methods and/or tools appreciated by one of ordinary skill in the art, even if not described in the present disclosure, may also be used.

The first and second plating layers 141 and 142 may be respectively disposed on the first and second band portions 131b and 132b. The plating layers 141 and 142 may serve to improve mounting characteristics, and as the plating layers 141 and 142 are disposed on the band portions 131b and 132b, a mounting space may be minimized, and it is possible to improve reliability by minimizing permeation of the plating solution into the internal electrode. One end of the first and second plating layers 141 and 142 may be in contact with the first surface, and the other end thereof may be in contact with the insulating layer 151.

The type of the plating layers 141 and 142 is not particularly limited, and may be a plating layer including at least one of Cu, Ni, Sn, Ag, Au, and Pd, and alloys thereof, and may be formed of a plurality of layers.

As a more specific example of the plating layers 141 and 142, the plating layers 141 and 142 may be a Ni plating layer or a Sn plating layer, and may have a form in which a Ni plating layer and a Sn plating layer are sequentially formed on the first and second band portions 131b and 132b.

In an embodiment, the first and second plating layers 141 and 142 may be disposed to extend to partially cover the first and second connection portions 131a and 132a, respectively. When an average size among the first and second internal electrodes 121 and 122 to an internal electrode, disposed closest to the first surface 1 in a first direction is H1, and an average distance from an extension line of the first surface 1 to an end of the first and second plating layers 141 and 142 disposed on the first and second connection portions 131a and 132a in a first direction is H2, H1>H2 may be satisfied. Accordingly, it is possible to suppress the permeation of the plating solution into the internal electrode during the plating process, thereby improving reliability.

The average sizes "H1" and "H2" may be values obtained by averaging values measured at a cross-section (L-T cross-section) obtained by cutting the body 110 in the first and second directions at five points having equal intervals in the third direction. H1 may be a value obtaining by averaging values measured at a point at which an internal electrode, disposed closest to the first surface, is connected to an external electrode in each cross-section, H2 may be a value obtained by averaging values measured based on an end of the plating layer in contact with an external electrode, and an extension line of the first surface, serving as a reference when measuring H1 and H2 may be the same. For example, the measurements may be taken by scanning the cross-section of the body 110 using a scanning electron microscope (SEM). Other methods and/or tools appreciated by one of ordinary skill in the art, even if not described in the present disclosure, may also be used.

In an embodiment, the first plating layer 141 may be disposed to cover an end disposed on the first external electrode layer 131 of the insulating layer 151, and the second plating layer 142 may be disposed to cover an end disposed on the second external electrode 132 of the insulating layer 151. Accordingly, reliability of the multilayer electronic component 1000 may be improved by strengthening bonding strength between the insulating layer 151 and the plating layers 141 and 142.

In an embodiment, the insulating layer 151 may be disposed to cover an end disposed on the first external electrode layer 131 of the first plating layer 141, and the insulating layer 151 may be disposed to cover an end disposed on the second external electrode 132 of the second plating layer 142. Accordingly, reliability of the multilayer electronic component 1000 may be improved by strengthening bonding strength between the insulating layer 151 and the plating layers 141 and 142.

In an embodiment, when an average size of the body in a second direction is L, an average distance from an extension line of the third surface to an end of the first band portion in the second direction is B1, and an average distance from an extension line of fourth surface to an end of the second band portion in the second direction is B2, $0.2 \leq B1/L \leq 0.4$ and $0.2 \leq B2/L \leq 0.4$ may be satisfied.

When B1/L and B2/L are less than 0.2, it may be difficult to secure sufficient adhesion strength. On the other hand, when B2/L exceeds 0.4, there is a concern that a leakage current may be generated between the first band portion 131*b* and the second band portion 132*b* under a high-voltage current, and there is a concern that the first band portion 131*b* and the second band portion 132*b* may be electrically connected to each other due to plating spreading, or the like, during the plating process.

The average sizes "B1", "B2", and "L" may be values obtained by averaging values measured in cross-sections (L-T cross-sections) obtained by cutting the body 110 in the first and second directions at five points having equal intervals in the third direction. For example, the measurements may be taken by scanning the cross-section of the body 110 using a scanning electron microscope (SEM). Other methods and/or tools appreciated by one of ordinary skill in the art, even if not described in the present disclosure, may also be used.

Referring to FIG. 5, illustrating a mounting substrate 1100 on which the multilayer electronic component 1000 is mounted, the plating layers 141 and 142 of the multilayer electronic component 1000 may be bonded to the electrode pads 181 and 182 disposed on the substrate 180 by the solders 191 and 192.

Meanwhile, when the internal electrodes 121 and 122 are stacked in a first direction, the multilayer electronic component 1000 may be horizontally mounted on the substrate 180 so that the internal electrodes 121 and 122 are parallel to a mounting surface. However, the present disclosure is not limited to the case of horizontal mounting, and when the internal electrodes 121 and 122 are stacked in a third direction, the multilayer electronic component may be vertically mounted on the substrate so that the internal electrodes 121 and 122 are perpendicular to a mounting surface.

A size of the multilayer electronic component 1000 does not need to be particularly limited.

However, in order to achieve miniaturization and high capacitance at the same time, it is necessary to increase the number of stacked layers thereof, by thinning the thickness of the dielectric layer and the internal electrode, so that, in the multilayer electronic component 1000 having a size of 1005 (length×width, 1.0 mm×0.5 mm) or less, the effect of improving the reliability and the capacitance per unit volume according to the present disclosure may be remarkably improved.

Accordingly, when a size (maximum size) of the multilayer electronic component 1000 in the second direction may be 1.1 mm or less, and a size (maximum size) thereof in the third direction may be 0.55 mm or less, considering manufacturing errors and sizes of external electrodes, and more preferably, the size of the multilayer electronic component 1000 in the second direction may be 0.44 mm or less, and the size thereof in the third direction may be 0.22 mm or less. In this case, the size of the multilayer electronic component in the second direction may refer to a maximum length of the multilayer electronic component, and the size of the multilayer electronic component in the third direction may refer to a maximum width of the multilayer electronic component. For example, the measurements may be taken by scanning the cross-section of the body 110 using an optical microscope. Other methods and/or tools appreciated by one of ordinary skill in the art, even if not described in the present disclosure, may also be used.

Figure 6:
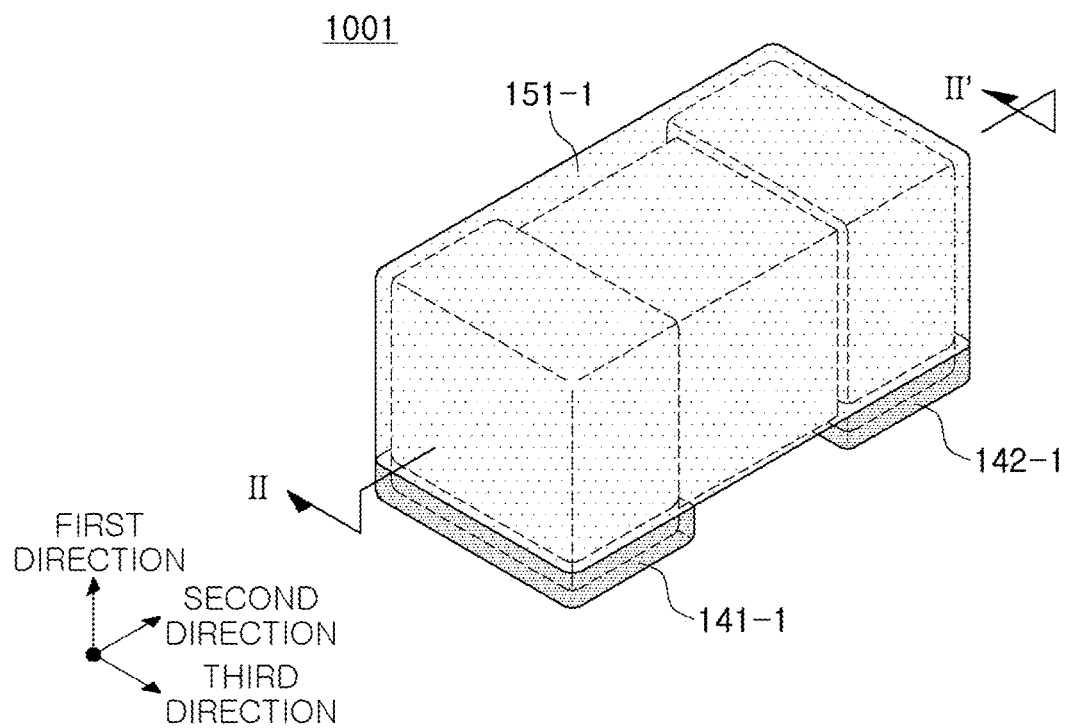
FIG. 6 is a schematic perspective view of a multilayer electronic component according to an embodiment of the present disclosure.
Figure 7:
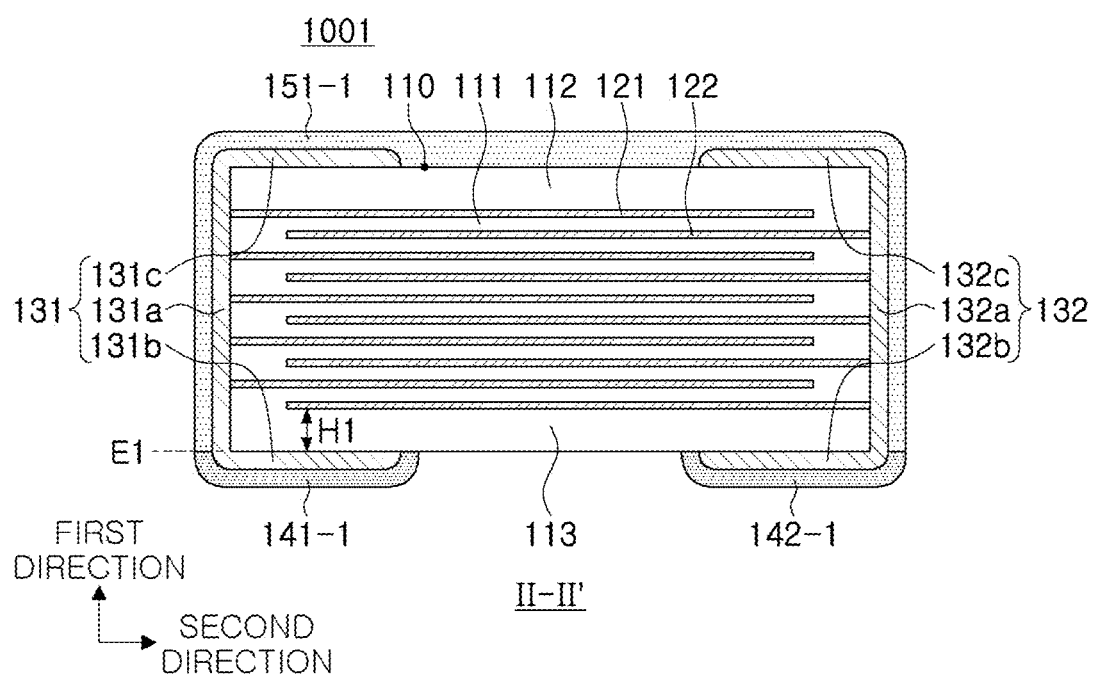
FIG. 7 is a cross-sectional view taken along line II-II' of FIG. 6.

FIG. 6 is a schematic perspective view of a multilayer electronic component 1001 according to an embodiment of the present disclosure, and FIG. 7 is a cross-sectional view taken along line II-II' of FIG. 6.

Referring to FIGS. 6 and 7, in the multilayer electronic component 1001 according to an embodiment of the present disclosure, first and second plating layers 141-1 and 142-1 may be disposed below an extension line E1 of a first surface. Accordingly, a height of a solder may be minimized during mounting and a mounting space may be minimized.

In addition, an insulating layer 151-1 may extend below the extension line of the first surface and may be disposed to be in contact with the first and second plating layers 141-1 and 142-1.

Figure 8:
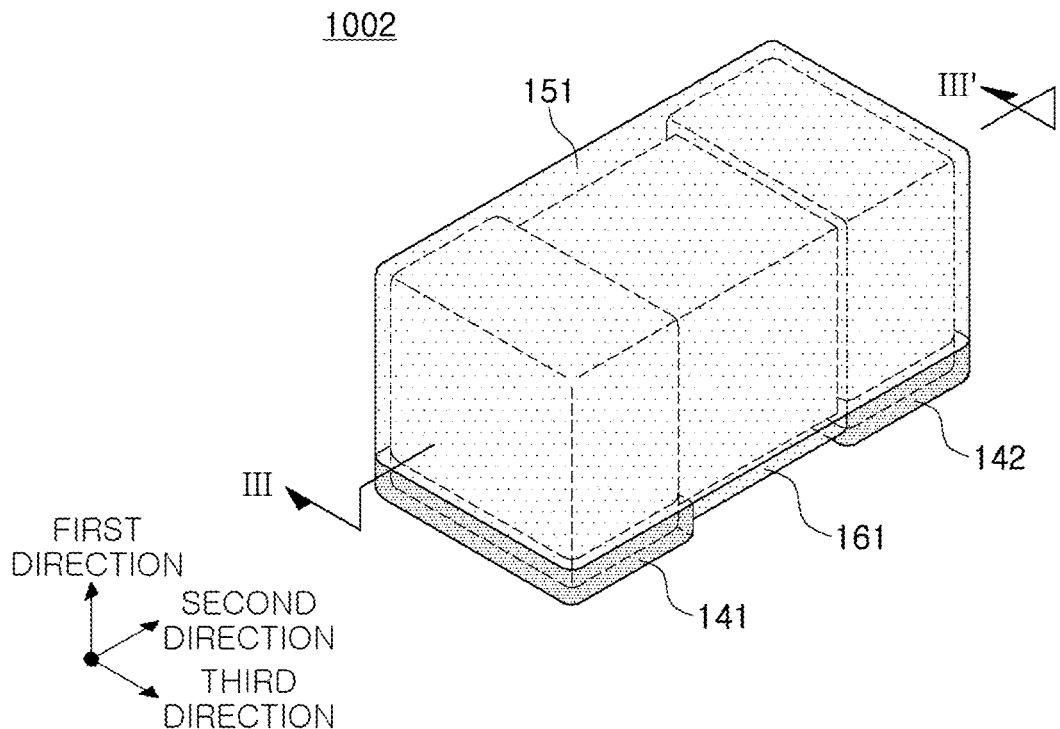
FIG. 8 is a schematic perspective view of a multilayer electronic component according to an embodiment of the present disclosure.
Figure 9:
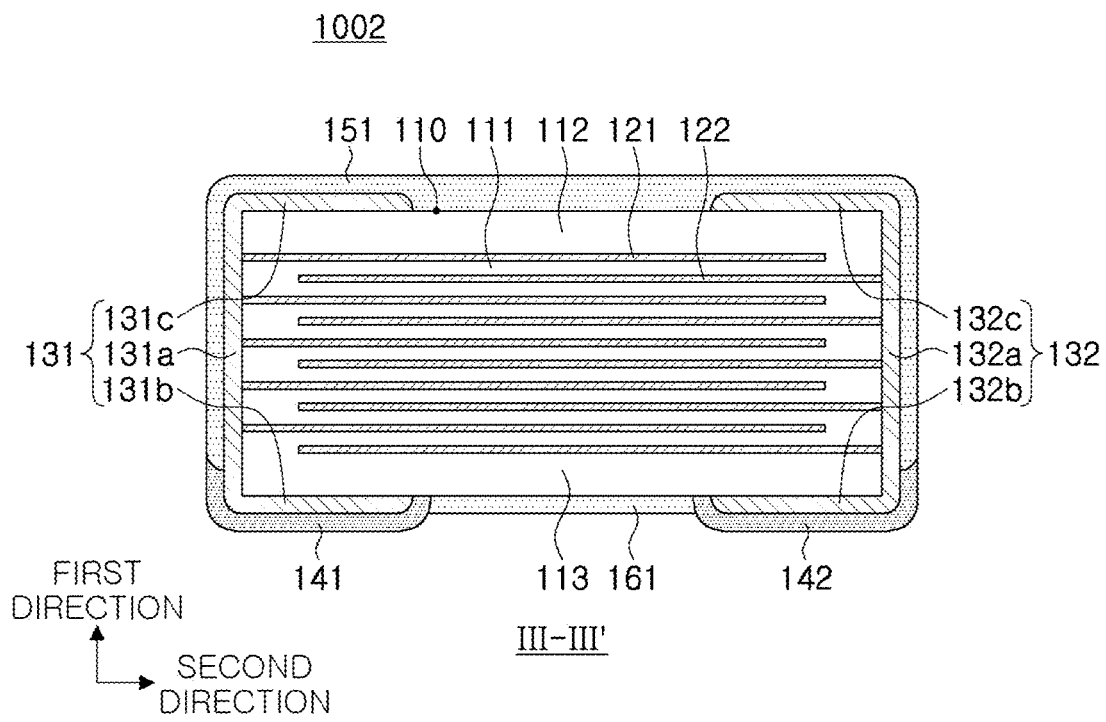
FIG. 9 is a cross-sectional view taken along line III-III' of FIG. 8.

FIG. 8 is a schematic perspective view of a multilayer electronic component 1002 according to an embodiment of the present disclosure, and FIG. 9 is a cross-sectional view taken along line III-III' of FIG. 8.

Referring to FIGS. 8 and 9, a multilayer electronic component 1002 according to an embodiment of the present disclosure may further include an additional insulating layer 161 disposed on the first surface 1 and disposed between a first band portion 131*b* and a second band portion 132*b*. Accordingly, it is possible to prevent leakage current that may occur between the first band portion 131*b* and the second band portion 132*b* under a high voltage current.

The type of the additional insulating layer 161 does not need to be particularly limited. For example, the additional insulating layer 161 may include a silicone-based resin like the insulating layer 151. For example, the additional insulating layer 161 may include a second silicone-based resin. The second silicone-based resin may be the same as or different from the first silicone-based resin. However, it is not necessary to limit the additional insulating layer 161 and the insulating layer 151 to the same material, and may be formed of different materials. For example, the material thereof may include at least one selected from an epoxy resin, an acrylic resin, ethyl cellulose, or the like, or may include glass. In addition, the additional insulating layer 161 may include at least one selected from $TiO_2$, $BaTiO_3$, $Al_2O_3$, $SiO_2$, $BaO$, and the like as an additive in addition to a polymer resin. Accordingly, it is possible to improve bonding strength with the body or the external electrodes.

Figure 10:
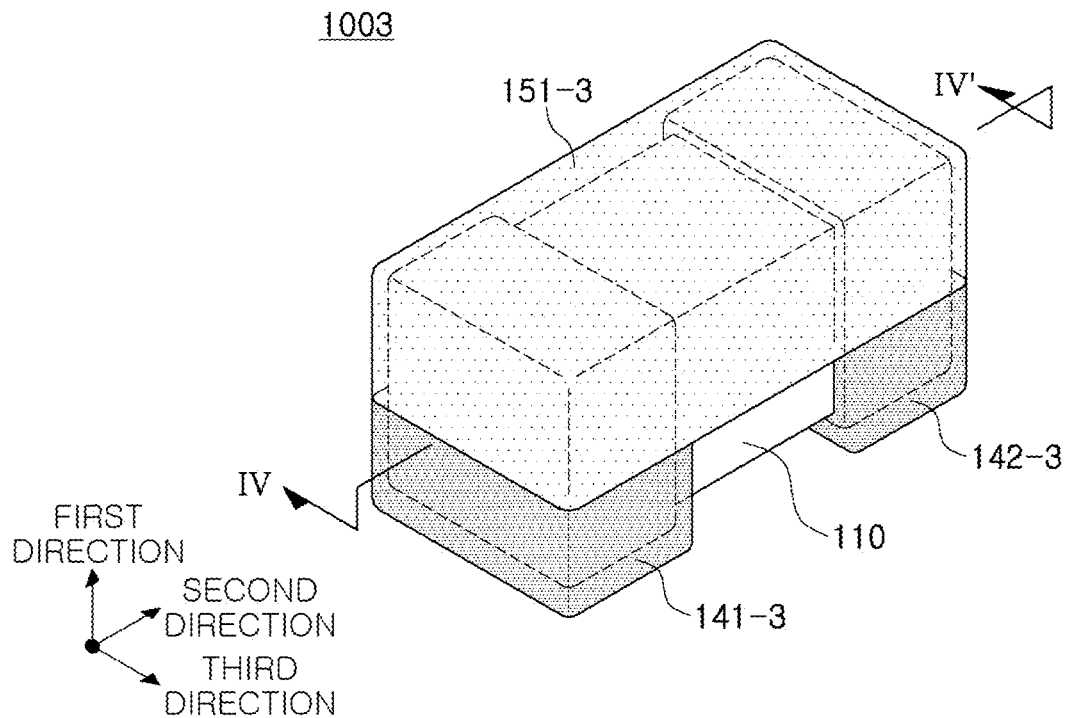
FIG. 10 is a schematic perspective view of a multilayer electronic component according to an embodiment of the present disclosure.
Figure 11:
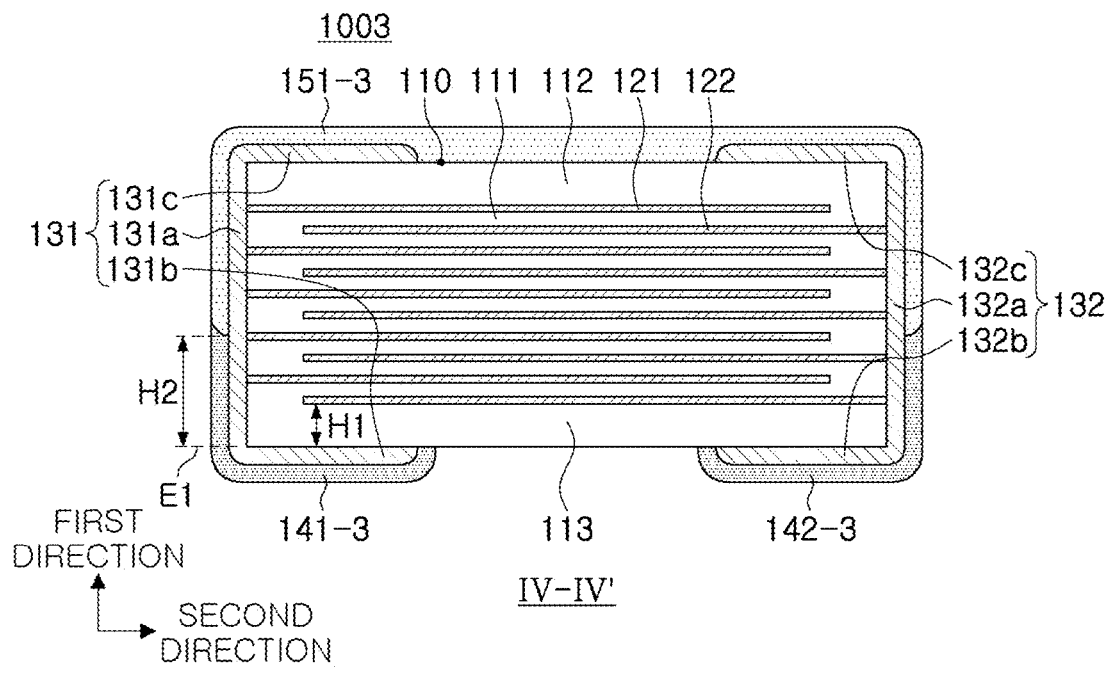
FIG. 11 is a cross-sectional view taken along line IV-IV' of FIG. 10.

FIG. 10 is a schematic perspective view of a multilayer electronic component 1003 according to an embodiment of the present disclosure, and FIG. 11 is a cross-sectional view taken along line IV-IV' of FIG. 10.

Referring to FIGS. 10 and 11, in the multilayer electronic component 1003 according to an embodiment, when an average distance from a first surface 1 to an internal electrode disposed closest to the first surface 1 among the first and second internal electrodes 121 and 122 in a first direction is H1, and an average distance from an extension line of the first surface 1 to an end of plating layers 141-3 and 142-3 disposed on the first and second connection portions 131a and 132a in a first direction is H2, H1<H2 may be satisfied. Accordingly, by increasing an area in contact with a solder during mounting, bonding strength may be improved.

More preferably, when an average size of the body 110 in a first direction is T, H2<T/2 may be satisfied. That is, H1<H2<T/2 may be satisfied. When H2 is T/2 or more, an effect of improving moisture resistance reliability by the insulating layer may decrease.

The average sizes "H1", "H2", and "T" may be values obtained by averaging values measured in cross-sections (L-T cross-sections) of the body 110 cut in the first and second directions at five points having equal intervals in a third direction. H1 may be an average value of values measured at a point at which the internal electrode disposed closest to the first surface 1 in each cross-section is connected to an external electrode, and H2 may be an average value of values obtained by averaging values measured with respect to an end of a plating layer in contact with the external electrode in each cross-section, and the extension line of the first surface serving as a reference when measuring H1 and H2 may be the same. For example, the measurements may be taken by scanning the cross-section of the body 110 using a scanning electron microscope (SEM). Other methods and/or tools appreciated by one of ordinary skill in the art, even if not described in the present disclosure, may also be used.

Figure 12:
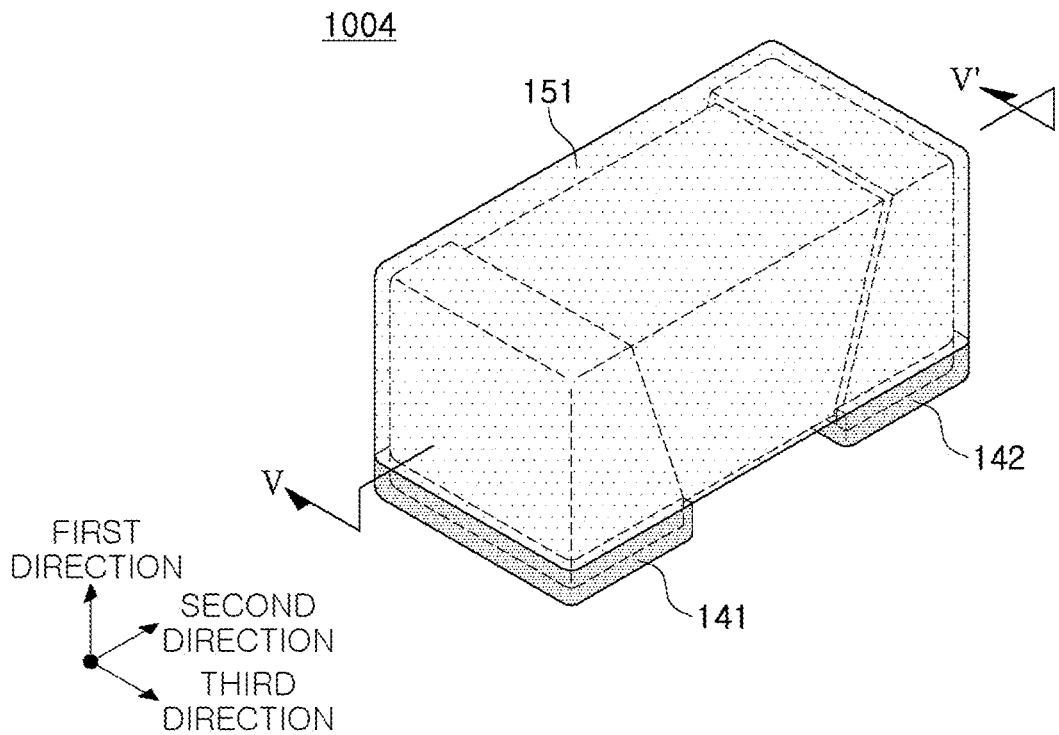
FIG. 12 is a schematic perspective view of a multilayer electronic component according to an embodiment of the present disclosure.
Figure 13:
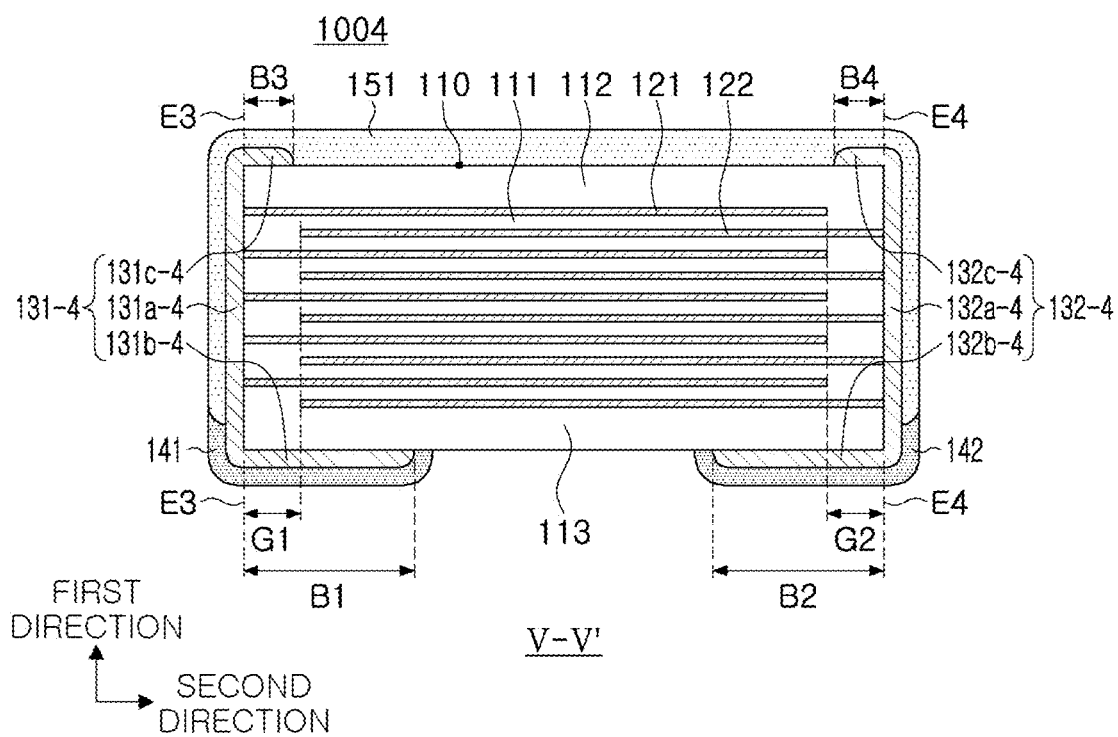
FIG. 13 is a cross-sectional view taken along line V-V' of FIG. 12.

FIG. 12 is a schematic perspective view of a multilayer electronic component 1004 according to an embodiment of the present disclosure, and FIG. 13 is a cross-sectional view taken along line V-V' of FIG. 12.

Referring to FIGS. 12 and 13, in the multilayer electronic component 1004 according to an embodiment of the present disclosure, an average length B1 of a first band portion 131b-4 may be longer than an average length B3 of a third band portion 131c-4, and an average length of a second band portion 132b-4 may be longer than an average length B4 of a fourth band portion 132c-4. Accordingly, by increasing an area in contact with a solder during mounting, adhesion strength may be improved.

More specifically, when an average distance from an extension line of a third surface 3 to an end of the first band portion 131b-4 in the second direction is B1, an average distance from an extension line of the fourth surface 4 to an end of the second band portion 132b-4 in the second direction is B2, an average distance from the extension line of the third surface 3 to an end of the third band portion 131c-4 in the second direction is B3, and an average distance from the extension line of the fourth surface 4 to an end of the fourth band portion 132c-4 in the second direction is B4, B3<B1 and B4<B2 may be satisfied.

In this case, when an average size of the body 110 in the second direction is L, $0.2 \leq B1/L \leq 0.4$ and $0.2 \leq B2/L \leq 0.4$ may be satisfied.

The average sizes "B1", "B2", "B3", "B4", and "L" may be values obtained by averaging values measured in the cross-sections (L-T cross-sections) of the body 110 cut in the first and second directions at five points having equal intervals in the third direction. For example, the measurements may be taken by scanning the cross-section of the body 110 using a scanning electron microscope (SEM). Other methods and/or tools appreciated by one of ordinary skill in the art, even if not described in the present disclosure, may also be used.

In addition, the first external electrode 131-4 may include a first side band portion extending from the first connection portion 131a-4 onto a portion of the fifth and sixth surfaces, and the second external electrode 132-4 may include a second side band portion extending from the second connection portion 132a-4 onto a portion of the fifth and sixth surfaces. In this case, sizes of the first and second side band portions in a second direction may gradually increase toward the first surface. That is, the first and second side band portions may be disposed in a tapered shape or a trapezoidal shape.

Furthermore, when an average distance from an extension line of the third surface to an end of the third band portion 131c-4 in the second direction is B3, an average distance from an extension line of the fourth surface to an end of the fourth band portion 132c-4 in the second direction is B4, an average size of a region, in which the third surface and the second internal electrode 122 are spaced apart from each other, in a second direction is G1, and an average size of a region, in which the fourth surface and the first internal electrode 121 are spaced apart from each other, in the second direction is G2, $B3 \leq G1$ and $B4 \leq G2$ may be satisfied. Accordingly, the capacitance per unit volume of the multilayer electronic component 1004 may be increased by minimizing a volume occupied by the external electrode.

In cross-sections of G1 and G2, obtained by cutting the body in the first and second directions from a center in the third direction, a value obtained by averaging sizes in the second direction spaced apart from a third surface measured for five second internal electrodes located in a central portion thereof in the first direction may be defined as G1, and a value obtained by averaging sizes of a region spaced apart from a fourth surface measured with respect to five arbitrary first internal electrodes located in the central portion in the first direction may be defined as G2. For example, the measurements may be taken by scanning the cross-section of the body 110 using a scanning electron microscope (SEM). Other methods and/or tools appreciated by one of ordinary skill in the art, even if not described in the present disclosure, may also be used.

Furthermore, G1 and G2 may be obtained from the cross sections (L-T cross-sections) cut in the first and second directions at five points having equal intervals in the third direction, and a value obtained by averaging thereof may be further generalized as G1 and G2.

However, it is not intended to limit the present disclosure to $B3 \leq G1$ and $B4 \leq G2$, and a case in which $B3 \geq G1$ and $B4 \geq G2$ are satisfied may be included as an embodiment of the present disclosure. Accordingly, in an embodiment, when an average distance from an extension line of a third surface to an end of a third band portion in the second direction is B3, an average distance from an extension line of the fourth surface to an end of the fourth band portion in the second direction is B4, an average size of a region, in which the third surface and the second internal electrode are spaced apart from each other, in a second direction is G1, and an average size of a region in which the fourth surface and the first internal electrode are spaced apart in the second direction is G2, $B3 \geq G1$ and $B4 \geq G2$ may be satisfied.

In an embodiment, when an average distance from an extension line of the third surface E3 to an end of the first band portion in the second direction is B1, an average distance from an extension line of the fourth surface to an end of the second band portion in the second direction is B2, $B1 \geq G1$ and $B2 \geq G2$ may be satisfied. Accordingly, the adhesion strength of the multilayer electronic component 1004 to the substrate 180 may be improved.

Figure 14:
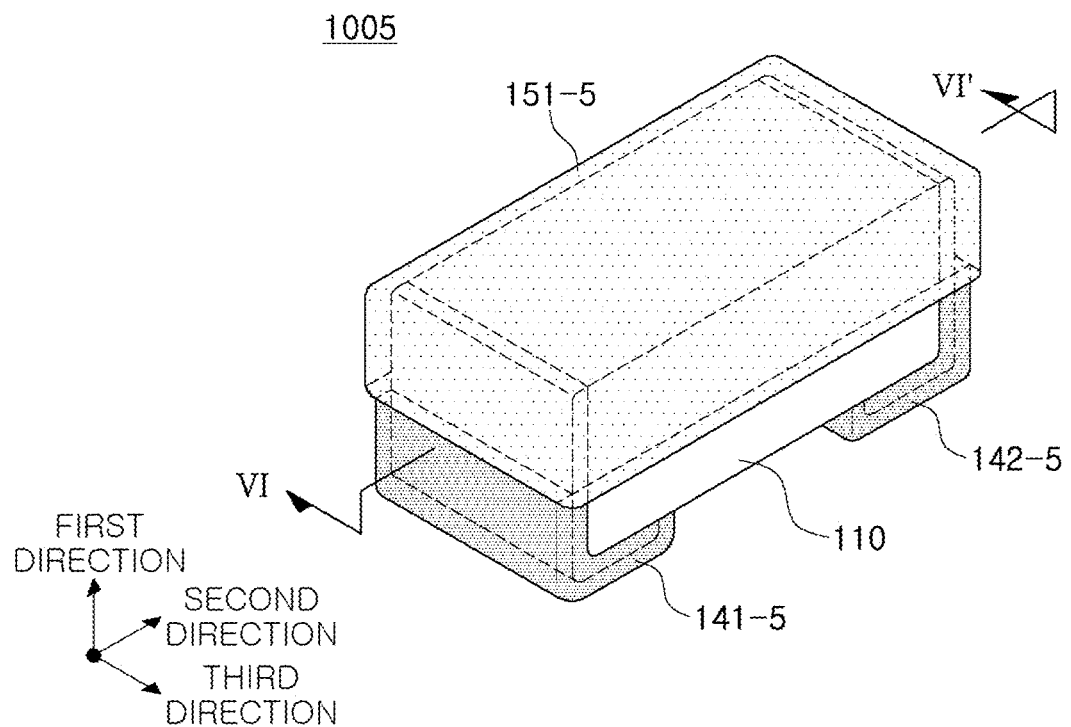
FIG. 14 is a schematic perspective view of a multilayer electronic component according to an embodiment of the present disclosure.
Figure 15:
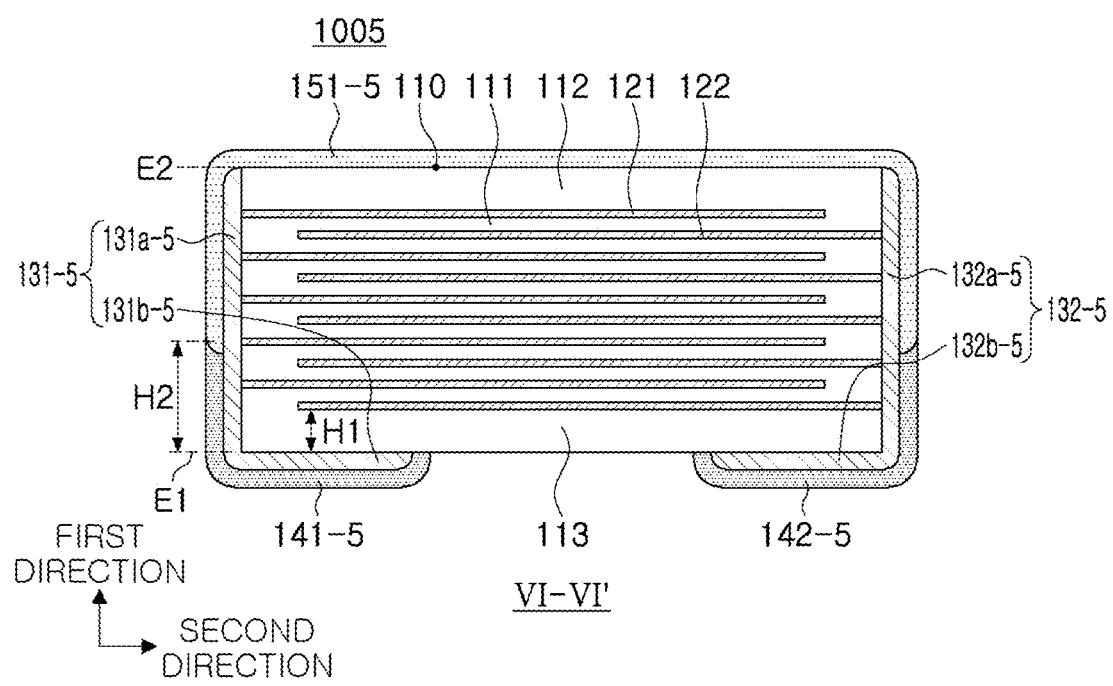
FIG. 15 is a cross-sectional view taken along VI-VI' of FIG. 14.

FIG. 14 is a schematic perspective view of a multilayer electronic component 1005 according to an embodiment of the present disclosure, and FIG. 15 is a cross-sectional view taken along line VI-VI' of FIG. 14.

Referring to FIGS. 14 and 15, first and second external electrodes 131-5 and 132-5 of the multilayer electronic component 1005 according to an embodiment of the present disclosure may not be disposed on the second surface, but be disposed on the third, fourth, and first surface to have an L-shape. That is, the first and second external electrodes 131-5 and 132-5 may be disposed below an extension line of the second surface.

The first external electrode 131-5 may include a first connection portion 131a-5 disposed on the third surface 3, and a first band portion 131b-5 extending from the first connection portion 131a-5 onto a portion of the first surface 1, and the second external electrode 132-5 may include a second connection portion 132a-5 disposed on the fourth surface 4, and a second band portion 132b-5 extending from the second connection portion 132a-5 onto a portion of the first surface 1. Since the external electrodes 131-5 and 132-5 are not disposed on the second surface 2, an insulating layer 151-5 may be disposed to cover the entirety of the second surface 2. Accordingly, since a volume occupied by the external electrodes 131-5 and 132-5 may be minimized, a capacitance per unit volume of the multilayer electronic component 1005 may be further improved. However, it is not necessary to limit to the insulating layer 151-5 to a form covering all of the second surface 2, and the insulating layer may not cover a portion of all of the second surface 2, but may be separated and cover the first and second connection portions 131a-5 and 132a-5, respectively.

In addition, the insulating layer 151-5 may be disposed to cover portions of the fifth and sixth surfaces to further improve reliability. In this case, portions of the fifth and sixth surfaces that are not covered by the insulating layer 151-5 may be exposed externally.

Furthermore, the insulating layer 151-5 may be disposed to cover the entirety of the fifth and sixth surfaces, and in this case, the fifth and sixth surfaces may not be exposed externally, thereby further improving moisture resistance reliability.

A first plating layer 141-5 may be disposed on the first band portion 131b-5, and a second plating layer 142-5 may be disposed on the second band portion 132b-5, and the first and second plating layers 141-5 and 142-5 may be disposed to extend onto portions of the first and second connection portions 131a-5 and 132a-5.

In this case, external electrodes 131-5 and 132-5 may not be disposed even on the fifth and sixth surfaces 5 and 6. That is, the external electrodes 131-5 and 132-5 may be disposed only on the third, fourth, and first surfaces.

When an average distance from a first surface 1 to an internal electrode disposed closest to the first surface 1 among the first and second internal electrodes 121 and 122 in a first direction is H1, and an average distance from an extension line of the first surface 1 to an end of plating layers 141-5 and 142-5 disposed on the first and second connection portions 131a-5 and 132a-5 in a first direction is H2, H1<H2 may be satisfied. Accordingly, adhesion strength may be improved by increasing an area, in contact with solder during mounting, an area in which the external electrodes 131-5 and 132-5 and the plating layers 141-5 and 142-5 are in contact may be increased to suppress an increase in equivalent series resistance (ESR).

More preferably, when an average size of the body 110 in a first direction is T, H2<T/2 may be satisfied. That is, H1<H2<T/2 may be satisfied. When H2 is T/2 or more, there is a concern that a moisture-resistance reliability improvement effect by an insulating layer may be reduced.

In addition, the first and second plating layers 141-5 and 142-5 may be disposed to cover a portion of the insulating layer 151-1 on the third and fourth surfaces. That is, the plating layers 141-5 and 142-5 may be disposed to cover an end of the insulating layer 151-5 on the third and fourth surfaces. Accordingly, the reliability of the multilayer electronic component 1005 may be improved by strengthening the bonding strength between the insulating layer 151-5 and the plating layers 141-5 and 142-5.

In addition, the insulating layer 151-1 may be disposed to cover a portion of the first and second plating layers 141-5 and 142-5 on the third and fourth surfaces. That is, the insulating layer 151-5 may be disposed to cover an end of the plating layers 141-5 and 142-5 on the third and fourth surfaces. Accordingly, the reliability of the multilayer electronic component 1005 may be improved by strengthening the bonding strength between the insulating layer 151-5 and the plating layers 141-5 and 142-5.

Figure 16:
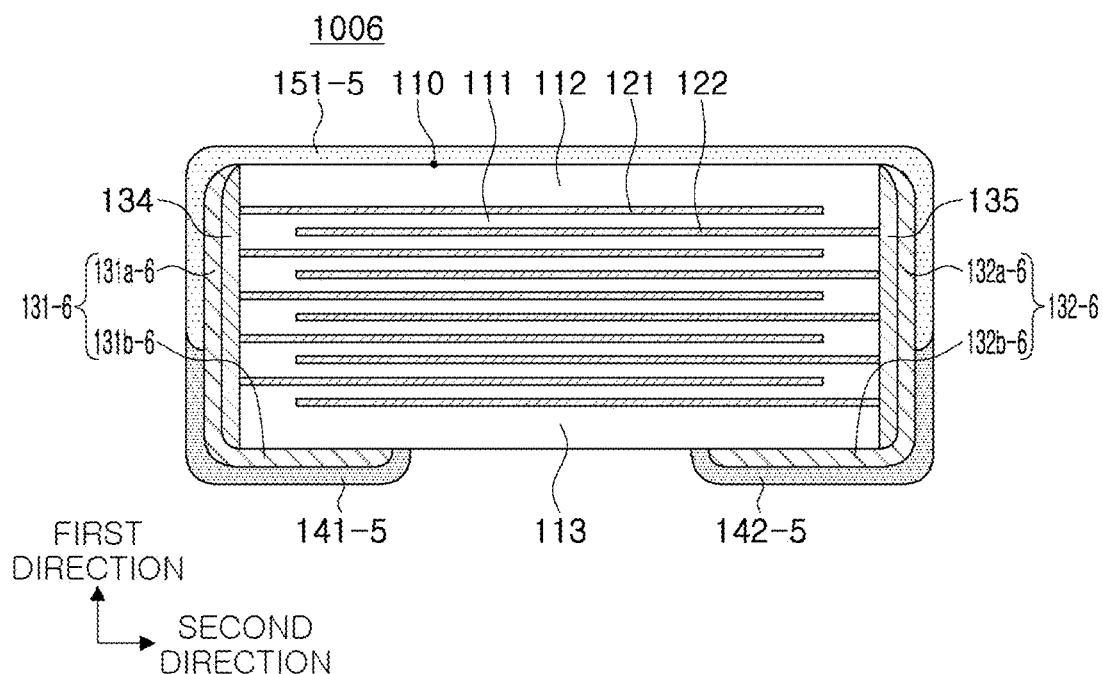
FIG. 16 illustrates a modified example of FIG. 14.

FIG. 16 illustrates a modified example of FIG. 14. Referring to FIG. 16, in a modified example 1006 of the multilayer electronic component 1005 according to an embodiment of the present disclosure, a first additional electrode layer 134 may be disposed between a first connection portion 131a-6 and the third surface. A second additional electrode layer 135 may be disposed between a second connection portion 132a-6 and the fourth surface. The first additional electrode layer 134 may be disposed within a range that does not deviate from the third surface, and the second additional electrode layer 135 may be disposed within a range that does not deviate from the fourth surface. The first and second additional electrode layers 134 and 135 may improve electrical connectivity between the internal electrodes 121 and 122 and the external electrodes 131-6 and 132-6, and may have excellent bonding strength to serve to further improve mechanical bonding strength of the external electrodes 131-6 and 132-6.

The first and second external electrodes 131-6 and 132-6 may have an L-shape in which the first and second external electrodes are not disposed on the second surface.

The first external electrode 131-6 may include a first connection portion 131a-6 disposed on the first additional electrode layer 134, and a first band portion 131b-6 extending from the first connection portion 131a-6 onto a portion of the first surface 1, and the second external electrode 132-6 may include a second connection portion 132a-6 disposed on the second additional electrode layer 135 and a second band portion 132b-6 extending from the second connection portion 132a-6 onto a portion of the first surface 1.

Meanwhile, the first and second additional electrode layers 134 and 135 may be formed of any material as long as they have electrical conductivity, such as metal, and a specific material thereof may be determined in consideration of electrical characteristics, structural stability, and the like. In addition, the first and second additional electrode layers 134 and 135 may be firing electrodes including a conductive metal and glass, or resin-based electrodes including a conductive metal and glass. In addition, the first and second additional electrode layers 134 and 135 may be formed by transferring a sheet including a conductive metal onto the body.

The conductive metal included in the first and second additional electrode layers 134 and 135, a material having excellent electrical conductivity may be used, but is not particularly limited. For example, the conductive metal may be at least one of Cu, Ni, Pd, Ag, Sn, Cr, and alloys thereof. Preferably, the first and second additional electrode layers 134 and 135 may include at least one of Ni and a Ni alloy, and thus, the connectivity with the internal electrodes 121 and 122 including Ni can be further improved.

Figure 17:
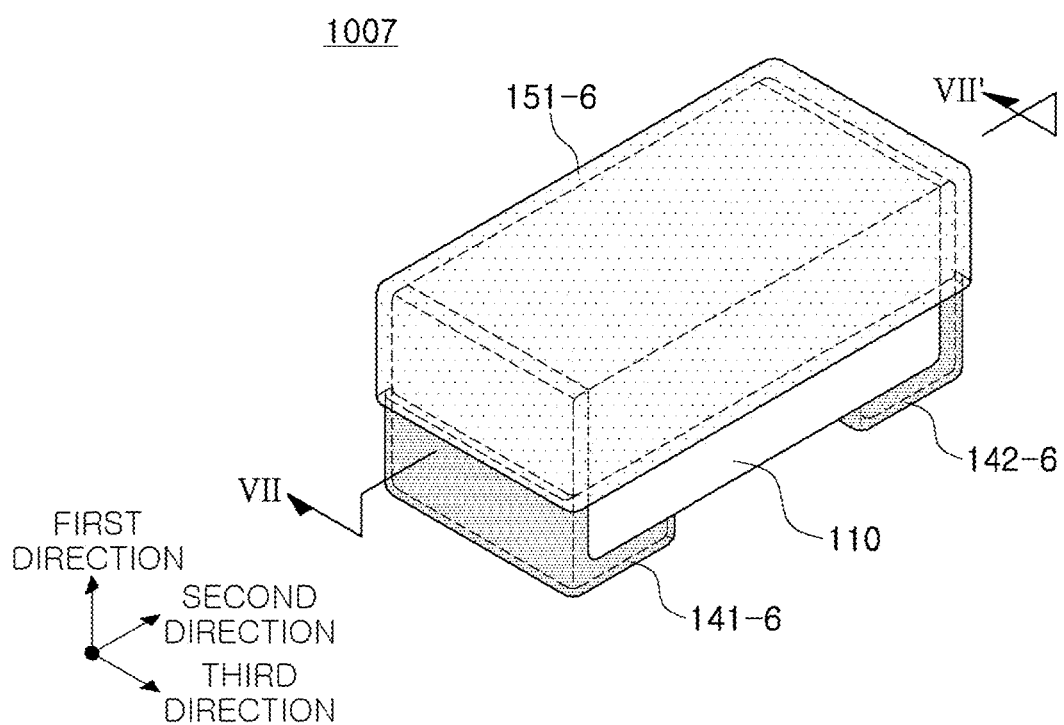
FIG. 17 is a schematic perspective view of a multilayer electronic component according to an embodiment of the present disclosure.
Figure 18:
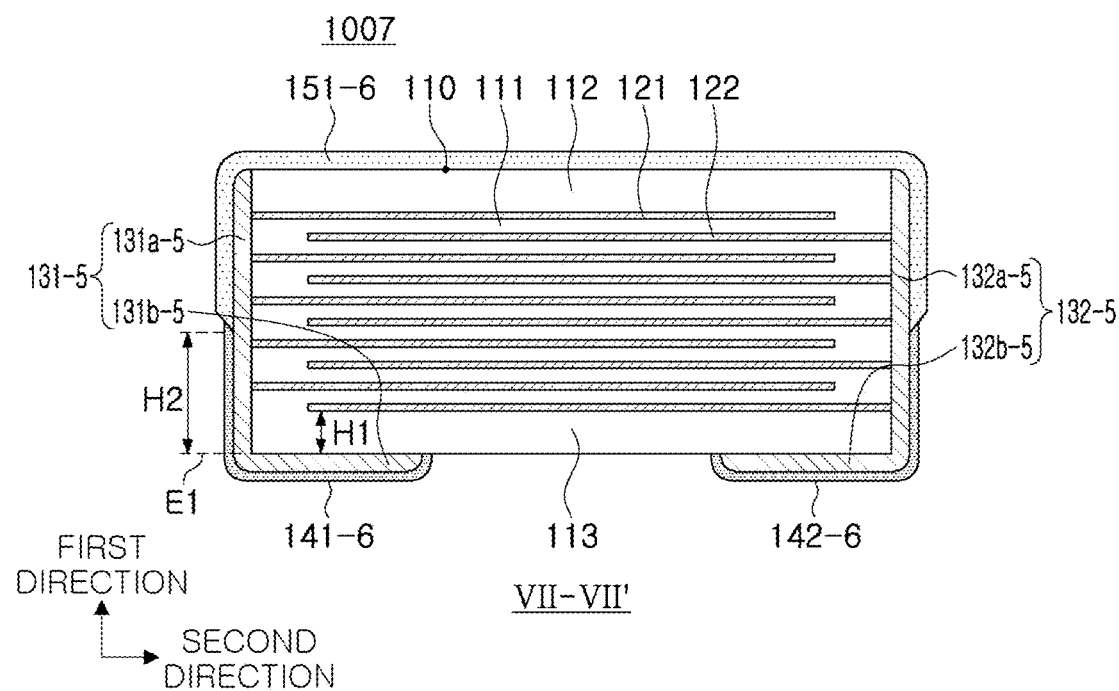
FIG. 18 is a cross-sectional view taken along line VII-VII' of FIG. 17.

FIG. 17 is a schematic perspective view of a multilayer electronic component 1007 according to an embodiment of the present disclosure, and FIG. 18 is a cross-sectional view taken along line VII-VII' of FIG. 17.

Referring to FIGS. 17 and 18, an average thickness "t1" of first and second plating layers 141-6 and 142-6 of the multilayer electronic component 1007 according to an embodiment of the present disclosure may be thinner than an average thickness "t2" of an insulating layer 151-6.

The insulating layer 151-6 may serve to prevent permeation of external moisture or permeation of a plating solution, but may have weak connectivity to plating layers 141-6 and 142-6, to cause of delamination of the plating layers 141-6 and 142-6. When the plating layer is delaminated, adhesion strength to the substrate 180 may be reduced. Here, the delamination of the plating layers 141-6 and 142-6 may mean that a plating layer is partially separated or is physically separated from the external electrodes 131-5 and 132-5. Since the connectivity between the plating layer and the insulating layer is weak, there is a high possibility that a gap at an interface between the insulating layer and the plating layer may be increased or foreign substances may permeate through the gap, and there is a high possibility that the plating layer may be delaminated due to vulnerability to external impact, or the like.

According to an embodiment of the present disclosure, the plating layer may be formed to have the average thickness "t1" thinner than the average thickness t2 of the insulating layer, so that a contact area between the plating layer and the insulating layer may be reduced. Accordingly, by suppressing occurrence of delamination may be suppressed to improve adhesion strength to the substrate 180 of the multilayer electronic component 1000.

The average thickness "t1" of the first and second plating layers 141-6 and 142-6 may be a value obtained by averaging thicknesses measured at five points disposed at equal intervals on the first and second plating layers 141-6 and 142-6 disposed on the first and second connection portions 131a-5 and 132a-5, respectively, and an average thickness "t2" may be a value obtained by averaging thicknesses measured at five points disposed at equal intervals on the insulating layer disposed on the first and second connection portions 131a-5 and 132a-5. For example, the measurements may be taken by scanning the cross-section of the body 110 using a scanning electron microscope (SEM). Other methods and/or tools appreciated by one of ordinary skill in the art, even if not described in the present disclosure, may also be used.

Figure 19:
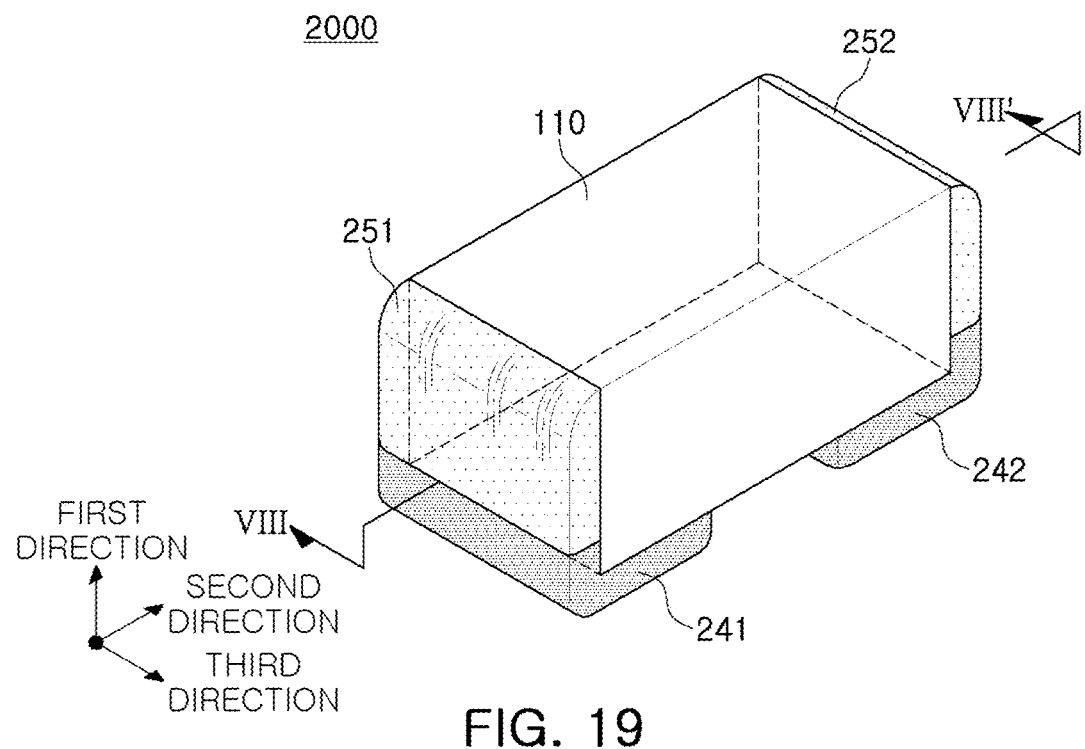
FIG. 19 is a schematic perspective view of a multilayer electronic component according to an embodiment of the present disclosure.
Figure 20:
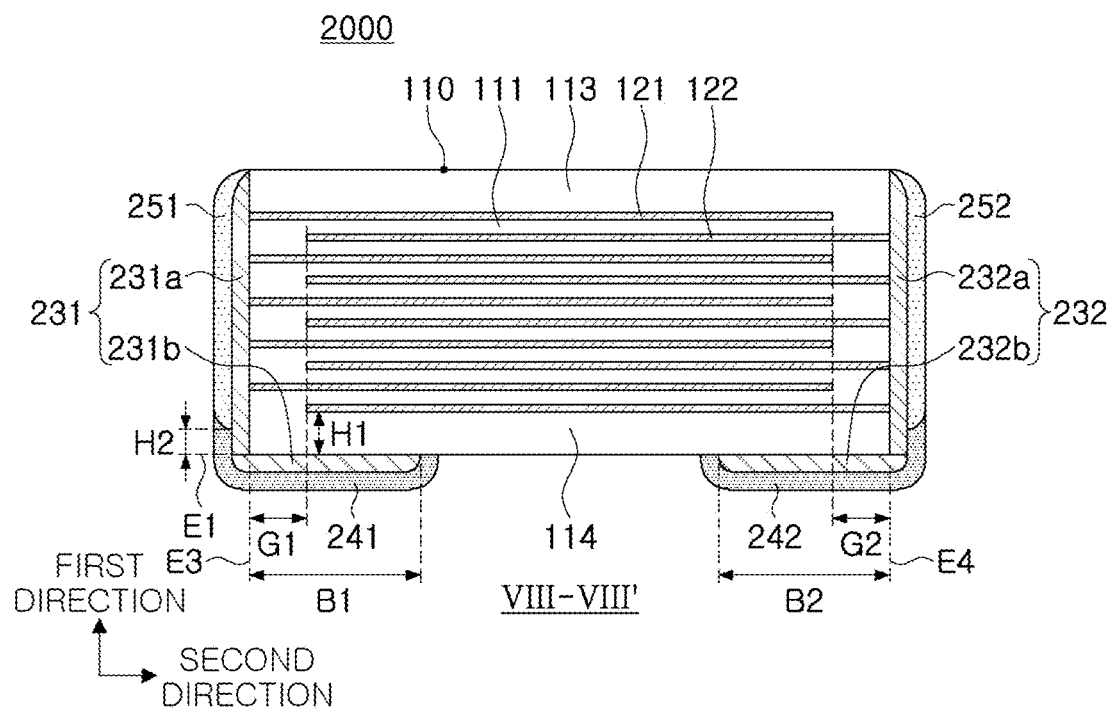
FIG. 20 is a cross-sectional view taken along line VIII-VIII' of FIG. 19.
Figure 21:
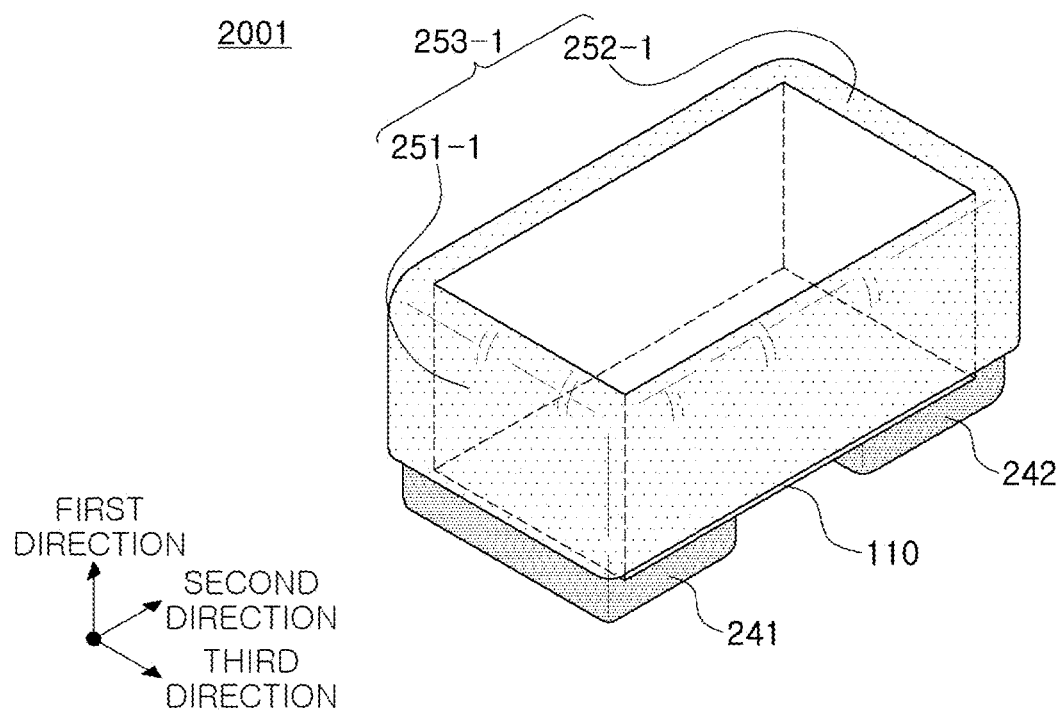
FIG. 21 illustrates a modified example of FIG. 19.

FIG. 19 is a schematic perspective view of a multilayer electronic component 2000 according to an embodiment of the present disclosure. FIG. 20 is a cross-sectional view taken along line VIII-VIII' of FIG. 19.

Hereinafter, a multilayer electronic component 2000 according to an embodiment of the present disclosure will be described in detail with reference to FIGS. 19 and 20. However, content overlapping with the above-described content may be omitted to avoid duplicated description.

According to an aspect of the present disclosure, a multilayer electronic component 2000, may include: a body 110 including a dielectric layer 111 and first and second internal electrodes 121 and 122 alternately disposed with the dielectric layer interposed therebetween, the body 110 having first and second surfaces 1 and 2 opposing each other in a first direction, third and fourth surfaces 3 and 4 connected to the first and second surfaces and opposing each other in a second direction, and fifth and sixth surfaces 5 and 6 connected to the first to fourth surfaces and opposing each other in a third direction; a first external electrode 231 including a first connection electrode 231a disposed on the third surface and a first band electrode 231b disposed on the first surface and connected to the first connection electrode; a second external electrode 232 including a second connection electrode 232a disposed on the fourth surface and a second band electrode 232b disposed on the first surface and connected to the second connection electrode; a first insulating layer 251 disposed on the first connection electrode; a second insulating layer 252 disposed on the second connection electrode; a first plating layer 241 disposed on the first band electrode; and a second plating layer 242 disposed on the second band electrode, wherein the insulating layers 251 and 252 may include a silicone-based resin (a first silicone-based resin).

The first connection electrode 231a may be disposed on the third surface to be connected to the first internal electrode 121, and the second connection electrode 231a may be disposed on the fourth surface 4 to be connected to the second internal electrode 122. In addition, a first insulating layer 251 may be disposed on the first connection electrode 231a, and a second insulating layer 252 may be disposed on the second connection electrode 232a.

In the related art, when forming an external electrode, a method of dipping a surface of the body, in which an external electrode is exposed into a paste has been mainly used. However, in the external electrode formed by the dipping method, a thickness of the external electrode in a central portion thereof in a thickness direction may be too thick. In addition, even if is not a problem of thickness imbalance of the external electrode according to the dipping method, since an internal electrode is exposed to the third and fourth surfaces of the body, in order to suppress permeation of moisture and a plating solution through the external electrode, the thickness of the external electrode disposed on the third and fourth surfaces was equal to or greater than a certain level.

On the other hand, in the present disclosure, since the insulating layers 251 and 252 are disposed on the connection electrodes 231a and 232a, even if a thickness of the connection electrodes 231a and 232a on the third and fourth surfaces where the internal electrodes are exposed is reduced, sufficient reliability can be secured.

The first and second connection electrodes 231a and 232a may have a shape corresponding to the third and fourth surfaces, respectively, and a surface of the first and second connection electrodes 231a and 232a facing the body 110 may have the same area as the third and fourth surfaces of the body 110, respectively. The first and second connection electrodes 231a and 232a may be disposed within a range that does not deviate from the third and fourth surfaces 3 and 4, respectively. The connection electrodes 231a and 232a may be disposed so as not to extend to the first, second, fifth, and sixth surfaces 1, 2, 5, and 6 of the body 110. Specifically, in an embodiment, the first and second connection electrodes 231a and 232a may be disposed to be spaced apart from the fifth and sixth surfaces. Accordingly, while securing sufficient connectivity between the internal electrodes 121 and 122 and the external electrodes 231 and 232, a volume occupied by the external electrodes can be minimized to increase the capacitance per unit volume of the multilayer electronic component 2000.

In this regard, the first and second connection electrodes 231a and 232a may be disposed to be spaced apart from the second surface 2. That is, as external electrodes 231 and 232 are not disposed on the second surface, a volume occupied by the external electrodes 231 and 232 may be further minimized to further increase the capacitance per unit volume of the multilayer electronic component 2000.

However, the connection electrodes 231a and 232a may extend to a corner of the body 110 and include a corner portion disposed on the corner. That is, in an embodiment, the first connection electrode may include a corner portion disposed to extend onto the 1-3 corner and the 2-3 corner, and the second connection electrode may include a corner portion disposed to extend onto the 1-4 corner and the 2-4 corner.

In addition, the connection electrodes 231a and 232a may have a uniform and thin thickness compared to an external electrode formed by a conventional dipping method.

A method of forming the connection electrodes 231a and 232a does not need to be particularly limited, but for example, the connection electrodes 231a and 232a may be formed by transferring a sheet including a conductive metal, an organic material such as a binder, and the like, to the third and fourth surfaces, but an embodiment thereof is not limited thereto. The connection electrodes 231a and 232a may be formed by plating a conductive metal on the third and fourth surfaces. That is, the connection electrodes 231a and 232a may be a sintered layer formed by sintering a conductive metal or a plating layer.

A thickness of the connection electrodes 231a and 232a is not particularly limited, but may be, for example, 2 to 7 μm. Here, the thickness of the connection electrodes 231a and 232a may mean a maximum thickness, and may mean a size of the connection electrodes 231a and 232a in a second direction.

In an embodiment, the first and second connection electrodes 231a and 232a may include the same metal as metal included in the internal electrodes 121 and 122 and glass. As the first and second connection electrodes 231a and 232a include the same metal as the metal included in the internal electrodes 121 and 122, electrical connectivity with the internal electrodes 121 and 122 may be improved, and as the first and second connection electrodes 231a and 232a include glass, bonding strength with the body 110 and/or the insulating layers 251 and 252 may be improved. In this case, the same metal as the metal included in the internal electrodes 121 and 122 may be Ni.

The first and second insulating layers 251 and 252 may be respectively disposed on the first and second connection electrodes 231a and 232a to serve to prevent a plating layer from being formed on the first and second connection electrodes 231a and 232a. In addition, the first and second insulating layers 251 and 252 may serve to minimize permeation of moisture or a plating solution from the outside by improving sealing characteristics.

The first and second insulating layers 251 and 252 may include a silicone-based resin. Accordingly, moisture resistance reliability can be further improved, and cracks due to thermal contraction, radiation cracks due to metal diffusion, and the like can be suppressed.

The first and second band electrodes 231b and 232b may be disposed on the first surface 1 of the body 110. The first and second band electrodes 231b and 232b may be in contact with the first and second connection electrodes 231a and 232a, respectively, to be electrically connected to the first and second internal electrodes 121 and 122, respectively.

An external electrode formed by the conventional dipping method was thickly formed on the third and fourth surfaces, is also partially extended to the first, second, fifth and sixth surfaces, so it was difficult to secure a high effective volume ratio.

On the other hand, according to an embodiment of the present disclosure, the first and second connection electrodes 231a and 232a may be disposed on a surface on which internal electrodes are exposed, and the first and second band electrodes 231b and 232b may be disposed on a surface to be mounted on the substrate, so that a high effective volume ratio may be secured.

Meanwhile, when the internal electrodes 121 and 122 are stacked in a first direction, the multilayer electronic component 2000 may be horizontally mounted on a substrate, so that the internal electrodes 121 and 122 are parallel to a mounting surface. However, the present disclosure is not limited to the case of horizontal mounting, and when the internal electrodes 121 and 122 are laminated in a third direction, the multilayer electronic component may be vertically mounted on the substrate, so that the internal electrodes 121 and 122 are perpendicular to a mounting surface.

The first and second band electrodes 231b and 232b may be formed of any material as long as they have electrical conductivity, such as metal, and a specific material may be determined in consideration of electrical characteristics and structural stability. For example, the first and second band electrodes 231b and 232b may be firing electrodes including a conductive metal and glass, and may be formed by applying a paste including a conductive metal and glass on the first surface of the body, but is not limited thereto, and may be a plating layer in which a conductive metal is plated on the first surface of the body.

As the conductive metal included in the first and second band electrodes 231b and 232b, a material having excellent electrical conductivity may be used, and the material is not particularly limited. For example, the conductive metal may be at least one of nickel (Ni), copper (Cu), and alloys thereof, and may include the same metal as the metal included in the internal electrodes 121 and 122.

Meanwhile, in an embodiment, the first external electrode 231 may further include a third band electrode (not illustrated) disposed on the second surface 2 and connected to the first connection electrode 231a, and the second external electrode 232 may further include a fourth band electrode (not illustrated) disposed on the second surface 2 and connected to the second connection electrode 232a.

In an embodiment, when a distance from an extension line E3 of the third surface to an end of the first band electrode 231b is B1, a distance from an extension line E4 of the fourth surface to an end of the second band electrode 232b is B2, a distance from the extension line of the third surface to an end of the third band electrode (not illustrated) is B3, a distance from the extension line of the fourth surface to an end of the fourth band electrode (not illustrated) is B4, an average size of a region in which the third surface and the second internal electrode 122 are spaced apart in a second direction is G1, and an average size of a region in which the fourth surface and the first internal electrode 121 are spaced apart is in a second direction is G2, B1≥G1, B3≤G1, B2≥G2 and B4≤G2 may be satisfied. Accordingly, a volume occupied by the external electrode may be minimized to increase a capacitance per unit volume of the multilayer electronic component 2000 and at the same time, to increase an area in contact with solder during mounting, thereby improving the adhesion strength.

However, it is not intended to limit the present disclosure to B1≥G1, B3≤G1, B2≥G2 and a case in which B4≤G2, and B1≥G1, B3≥G1, B2≥G2 and B4≥G2, may be included in an embodiment of the present disclosure. Accordingly, in an embodiment, when a distance from an extension line E3 of the third surface to an end of the first band electrode 231b is B1, a distance from an extension line of the fourth surface to an end of the second band electrode 232b is B2, a distance from the extension line of the third surface n end of the third band electrode (not illustrated) is B3, a distance from the extension line of the fourth surface to an end of the fourth band electrode (not illustrated) is B4, an average size of a region in which the third surface and the second internal electrode 122 are spaced apart in a second direction is G1, and an average size of a region in which the fourth surface and the first internal electrode 121 are spaced apart in a second direction is G2, B1≥G1, B3≥G1, B2≥G2 and B4≥G2 may be satisfied. Accordingly, any one of the first and second surfaces can be used as a mounting surface, thereby improving ease of mounting.

The first and second plating layers 241 and 242 may be disposed on the first and second band electrodes 231b and 232b. The first and second plating layers 241 and 242 serve to improve mounting characteristics. The types of the first and second plating layers 241 and 242 are not particularly limited, and may be a plating layer including at least one of Ni, Sn, Pd, and alloys thereof, and may be formed of a plurality of layers.

As a more specific example of the first and second plating layers 241 and 242, the first and second plating layers 241 and 242 may be a Ni plating layer or a Sn plating layer, and may have a form in which a Ni plating layer and a Sn plating layer are sequentially formed on the first and second band electrodes 231b and 232b.

In an embodiment, the first and second plating layers 241 and 242 may extend to partially cover the first and second connection electrodes 231a and 232a, respectively.

When an average distance from a first surface 1 to an internal electrode disposed to be closest to the first surface 1 among the first and second internal electrodes 121 and 122 in a first direction is H1, and an average distance from an extension line of the first surface 1 to ends of the first and second plating layers 241 and 242 disposed on the first and second connection electrodes 231a and 232a in a first direction is H2, H1>H2 can be satisfied. Accordingly, it is possible to suppress permeation of a plating solution into the internal electrode during the plating process, thereby improving reliability.

In an embodiment, the first and second insulating layers 251 and 252 may be in direct contact with the first and second connection electrodes 231a and 232a, respectively, and the first and second connection electrodes 231a and 232a may include a conductive metal and glass. Accordingly, since the plating layers 241 and 242 may not be disposed on a region in which the insulating layers 251 and 252 are disposed among outer surfaces of the first and second connection electrodes 231a and 232a, it is possible to effectively suppress erosion of the external electrode by the plating solution.

In an embodiment, the first and second insulating layers 251 and 252 may be in direct contact with the first and second connection electrodes 231a and 232a, respectively, and the first and second connection electrodes 231a and 232a may include a conductive metal and a resin. Accordingly, the first and second insulating layers 251 and 252 may be in direct contact with the first and second connection electrodes 231a and 232a, respectively, and the first and second connection electrodes 231a and 232a may include a conductive metal and a resin. Accordingly, since the plating layers 241 and 242 may not be disposed in a region in which the insulating layers 251 and 252 are disposed, it is possible to effectively suppress erosion of the external electrode by the plating solution.

In an embodiment, the first plating layer 241 may be disposed to cover an end disposed on the first external electrode 231 of the first insulating layer 251, and the second plating layer 242 may be disposed to cover an end disposed on the second external electrode 232 of the second insulating layer 252. Accordingly, reliability of the multilayer electronic component 3000 may be improved by strengthening the bonding strength between the insulating layers 251 and 252 and the plating layers 241 and 242. In addition, by first forming the first and second insulating layers 251 and 252 before forming the plating layers 241 and 242 on the external electrodes 231 and 232, permeation of the plating solution in a process of forming the plating layers can be more reliably suppressed. As the insulating layer is formed before the plating layer, the plating layers 241 and 242 may have a shape covering the ends of the insulating layers 251 and 252.

In an embodiment, the first insulating layer 251 may be disposed to cover an end disposed on the first external electrode 231 of the first plating layer 241, and the second insulating layer 252 may be disposed to cover an end disposed on the second external electrode 232 of the second plating layer 242. Accordingly, the reliability of the multilayer electronic component 3000 may be improved by strengthening the bonding strength between the insulating layer 251 and the plating layers 241 and 242.

In an embodiment, the first insulating layer 251 may be disposed to cover an end disposed on the first external electrode 231 of the first plating layer 241, and the second insulating layer 252 may be disposed to cover an end disposed on the second external electrode 232 of the second plating layer 242. Accordingly, the reliability of the multilayer electronic component 3000 may be improved by strengthening the bonding strength between the insulating layer 251 and the plating layers 241 and 242.

Figure 22:
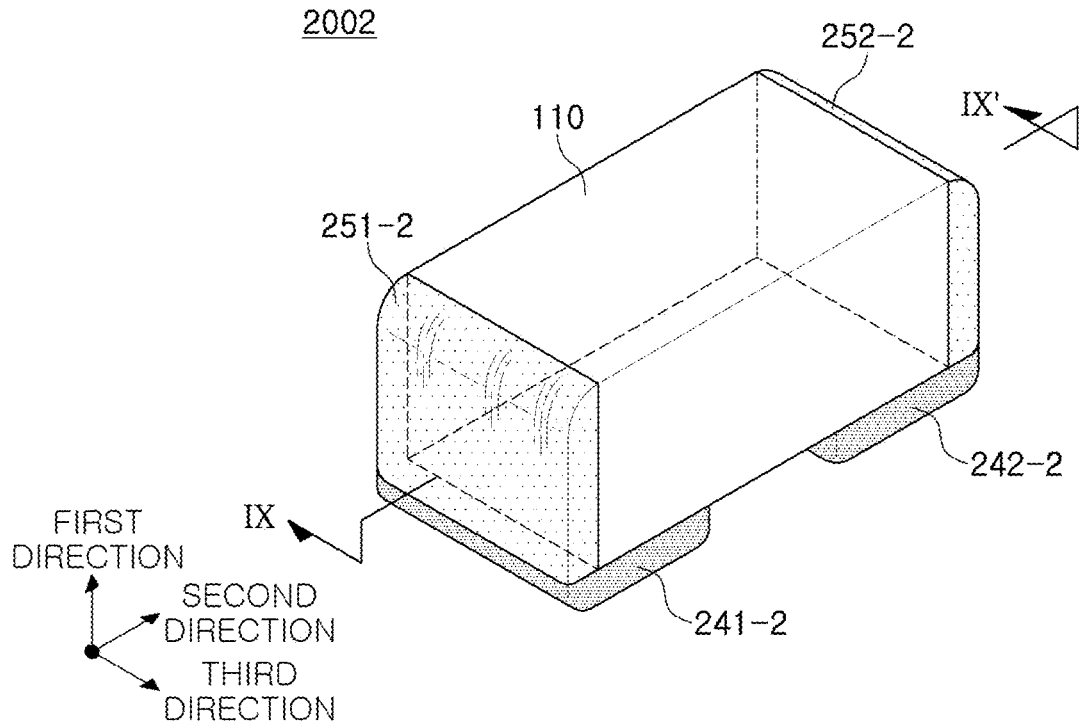
FIG. 22 is a schematic perspective view of multilayer electronic component according to an embodiment of the present disclosure.
Figure 23:
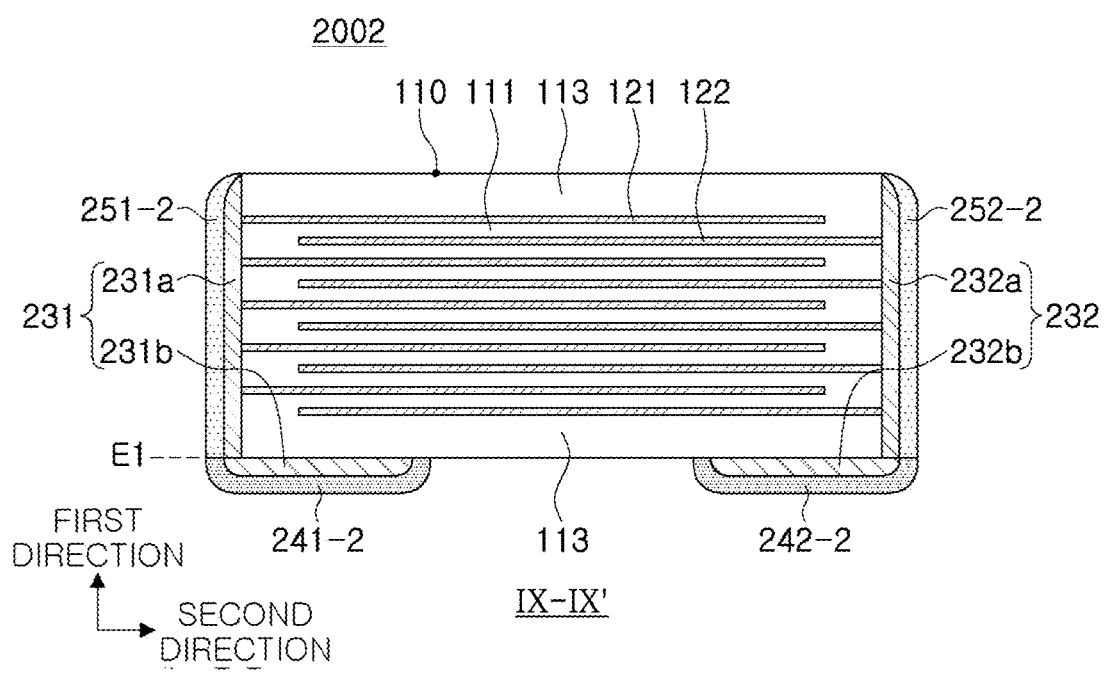
FIG. 23 is a cross-sectional view taken along line IX-IX' of FIG. 22.

FIG. 22 is a schematic perspective view of a multilayer electronic component 2002 according to an embodiment of the present disclosure. FIG. 23 is a cross-sectional view taken along line IX-IX' of FIG. 22.

Referring to FIGS. 22 and 23, in the multilayer electronic component 2002 according to an embodiment of the present disclosure, first and second plating layers 241-2 and 242-2 may be disposed below an extension line of the first surface. Accordingly, a height of a solder can be minimized during mounting and a mounting space can be minimized.

In addition, the first and second insulating layers 251-2 and 252-2 may extend below an extension line of the first surface and be disposed to be in contact with the first and second plating layers 241-2 and 242-2.

Figure 24:
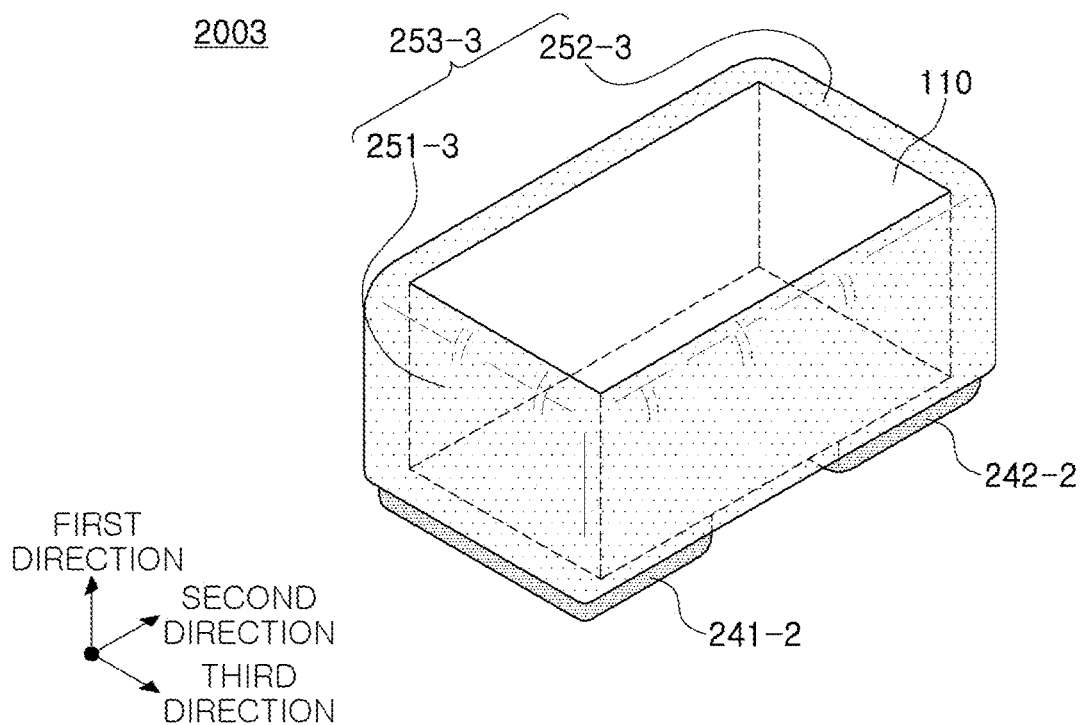
FIG. 24 illustrates a modified example of FIG. 22.

FIG. 24 illustrates a modified example of FIG. 22. Referring to FIG. 24, in a modified example 2003 of a multilayer electronic component 2002 according to an embodiment of the present disclosure, first and second insulating layers 251-3 and 252-3 may extend to the fifth and sixth surfaces 5 and 6 and connected to each other so as to be connected to one insulating layer 253-5. In this case, the connected first and second insulating layers 253-3 may be disposed to cover all of the fifth and sixth surfaces.

Figure 25:
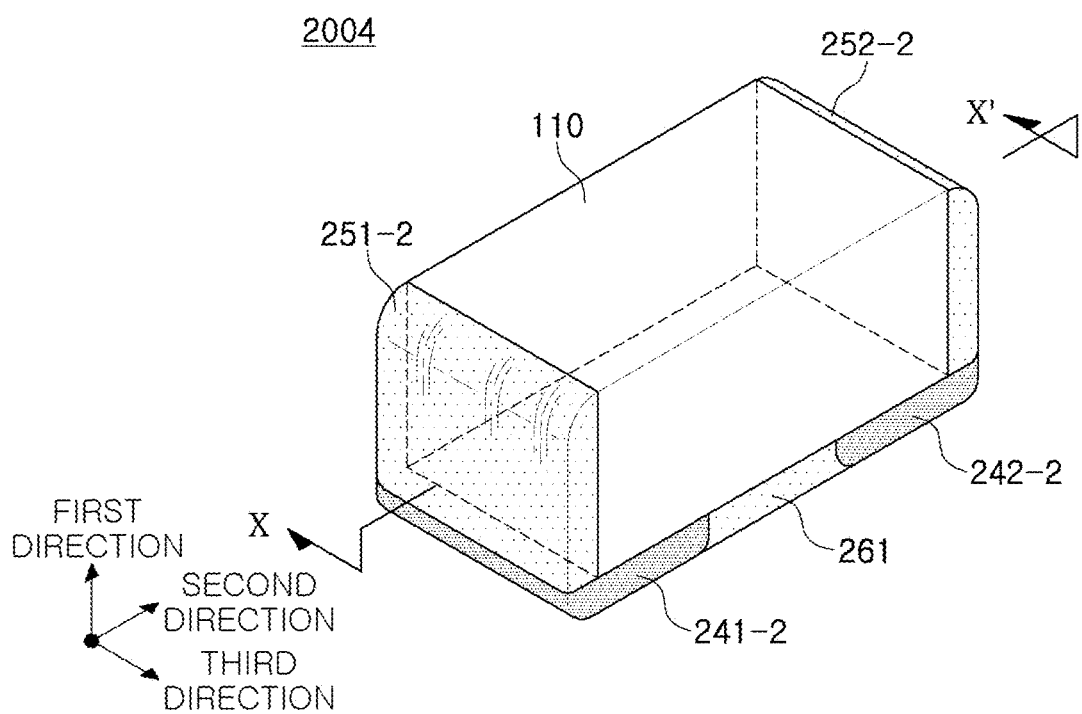
FIG. 25 is a schematic perspective view of a multilayer electronic component according to an embodiment of the present disclosure.
Figure 26:
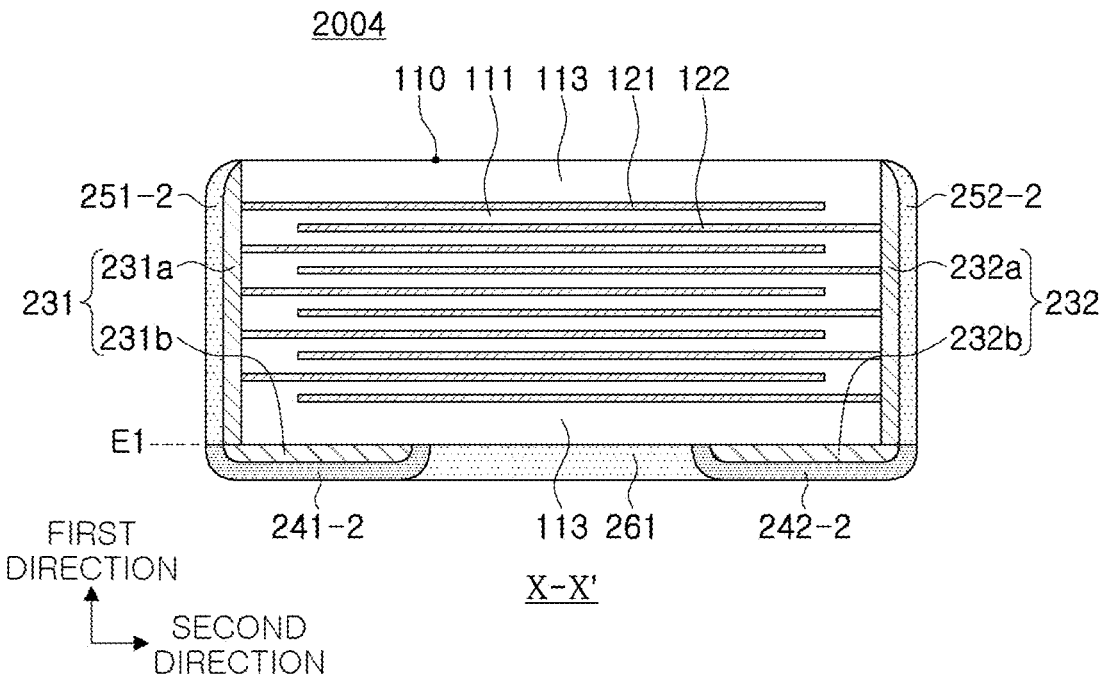
FIG. 26 is a cross-sectional view taken along line X-X' of FIG. 25.

FIG. 25 is a schematic perspective view of a multilayer electronic component 2004 according to an embodiment of the present disclosure. FIG. 26 is a cross-sectional view taken along line X-X' of FIG. 25.

Referring to FIGS. 25 and 26, the multilayer electronic component 2004 according to an embodiment of the present disclosure may further include an additional insulating layer 261 disposed on the first surface 1 and disposed between a first band electrode 231b and a second band electrode 232b. Accordingly, it is possible to prevent a leakage current, or the like that may occur between the first band electrode 231b and the second band electrode 232b under a high voltage current.

The type of the additional insulating layer 261 does not need to be particularly limited. For example, the additional insulating layer 261 may include a silicone-based resin (a second silicone-based resin), like the first and second insulating layers 251-2 and 252-2. However, it is not necessary to limit the additional insulating layer 261 and the first and second insulating layers 251-2 and 252-2 to the same material, and may be formed of different materials. For example, the additional insulating layer 261 may include at least one selected from an epoxy resin, an acrylic resin, ethyl cellulose, or the like, or may include glass.

Figure 27:
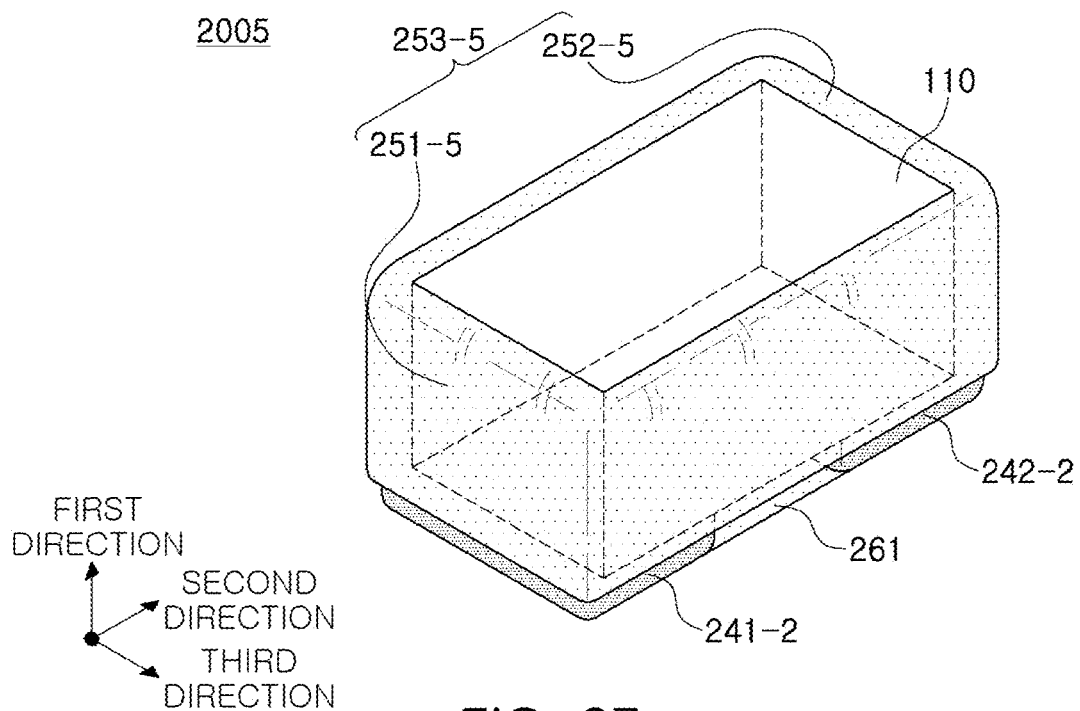
FIG. 27 illustrates a modified example of FIG. 25.

FIG. 27 illustrates a modified example of FIG. 25. Referring to FIG. 27, in a modified example 2005 of a electronic component 2004 according to an multilayer embodiment of the present disclosure, first and second insulating layers 251-5 and 252-5 may extend to the fifth and sixth surfaces 5 and 6 and connected to each other so as to be connected to one insulating layer 253-5.

Figure 28:
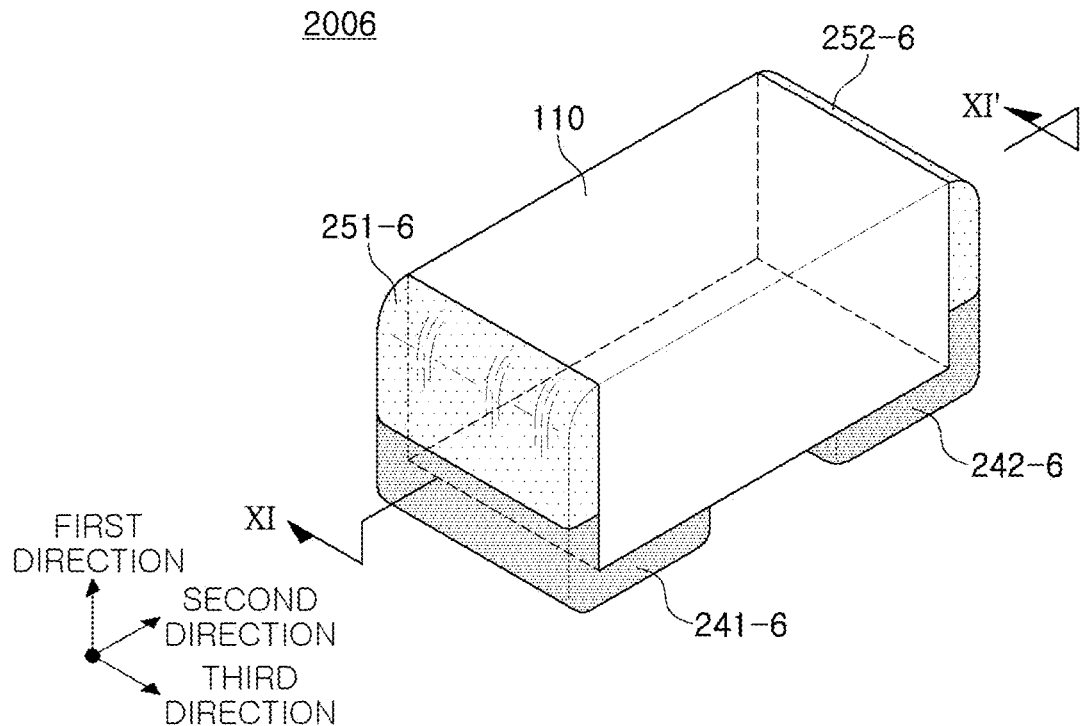
FIG. 28 is a schematic perspective view of a multilayer electronic component according to an embodiment of the present disclosure.
Figure 29:
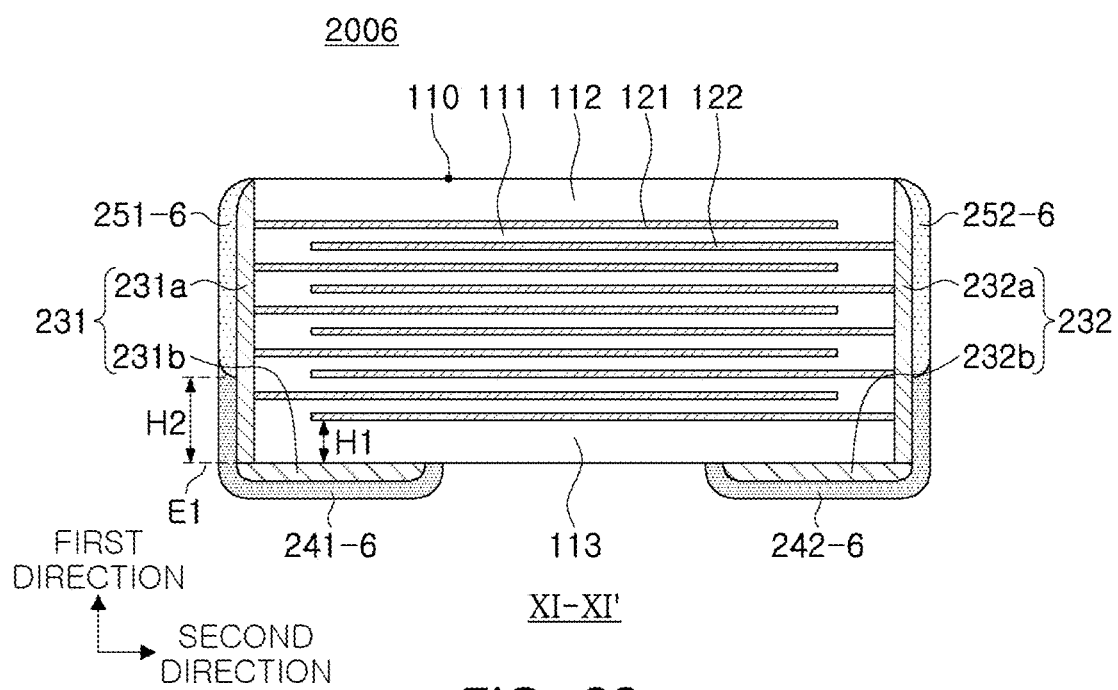
FIG. 29 is a cross-sectional view taken along line XI-XI' of FIG. 28.

FIG. 28 is a schematic perspective view of a multilayer electronic component 2006 according to an embodiment of the present disclosure. FIG. 29 is a cross-sectional view taken along line XI-XI' of FIG. 28.

Referring to FIGS. 28 and 29, the multilayer electronic component 2006 according to an embodiment may include a first insulating layer 251-6 disposed on the first connection electrode 231a, and a second insulating layer 252-6 disposed on the second connection electrode 232a, and when an average distance from a first surface 1 to an internal electrode disposed closest to the first surface among the first and second internal electrodes 121 and 122 in a first direction is H1, and an average size (rom an extension line of the first surface 1 to ends of first and second plating layers 241-6 and 242-6 disposed on the first and second connection electrodes 231a and 232a in a first direction is H2, H1<H2 may be satisfied. Accordingly, by increasing an area in contact with a solder during mounting, adhesion strength may be improved.

More preferably, when an average size of the body 110 in a first direction is T, H2<T/2 may be satisfied. That is, H1<H2<T/2 may be satisfied. That is because there is a possibility that a moisture-resistance reliability improvement effect by an insulating layer may be reduced when H2 is T/2 or more.

Figure 30:
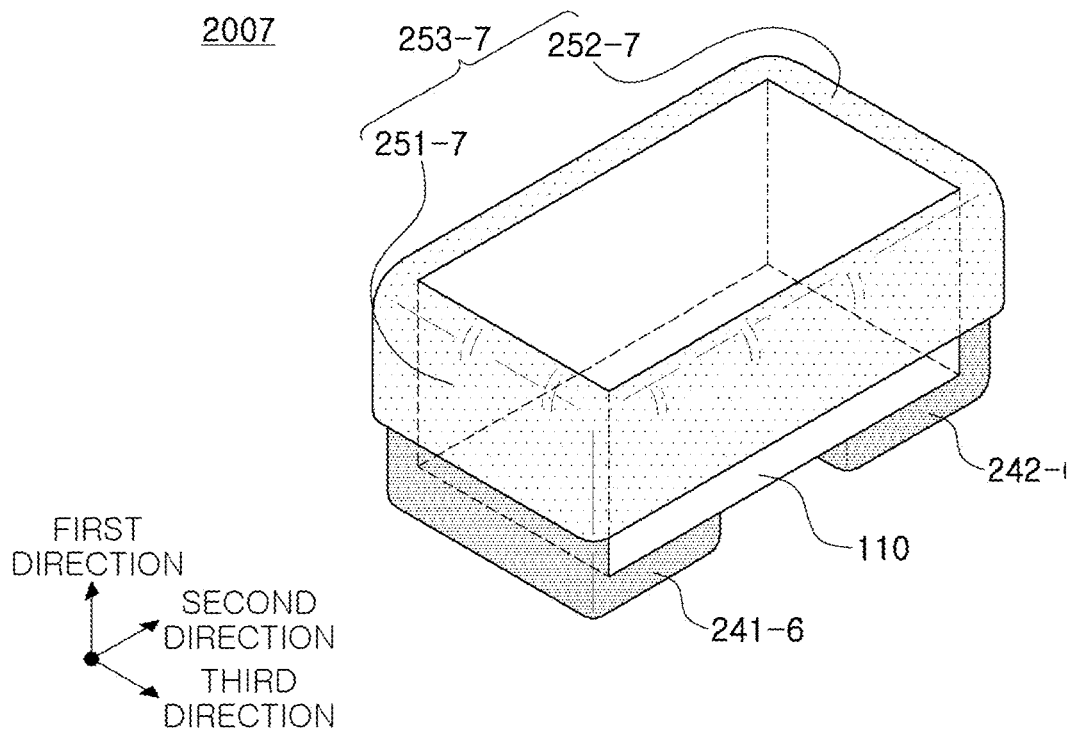
FIG. 30 illustrates a modified example of FIG. 28.

FIG. 30 illustrates a modified example of FIG. 28. Referring to FIG. 30, in a modified example 2007 of a multilayer electronic component 2006 according to an embodiment of the present disclosure, first and second insulating layers 251-7 and 252-7 may extend to the fifth and sixth surfaces 5 and 6 and connected to each other so as to be connected to one insulating layer 253-7.

Figure 31:
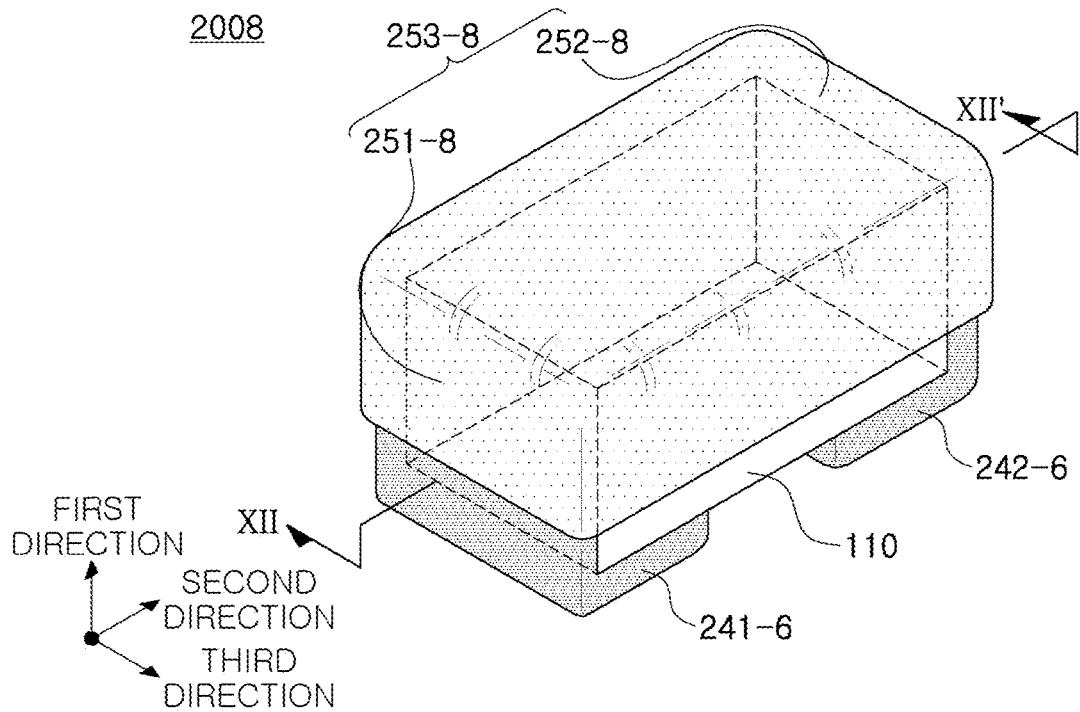
FIG. 31 is a schematic perspective view of a multilayer electronic component according to an embodiment of the present disclosure.
Figure 32:
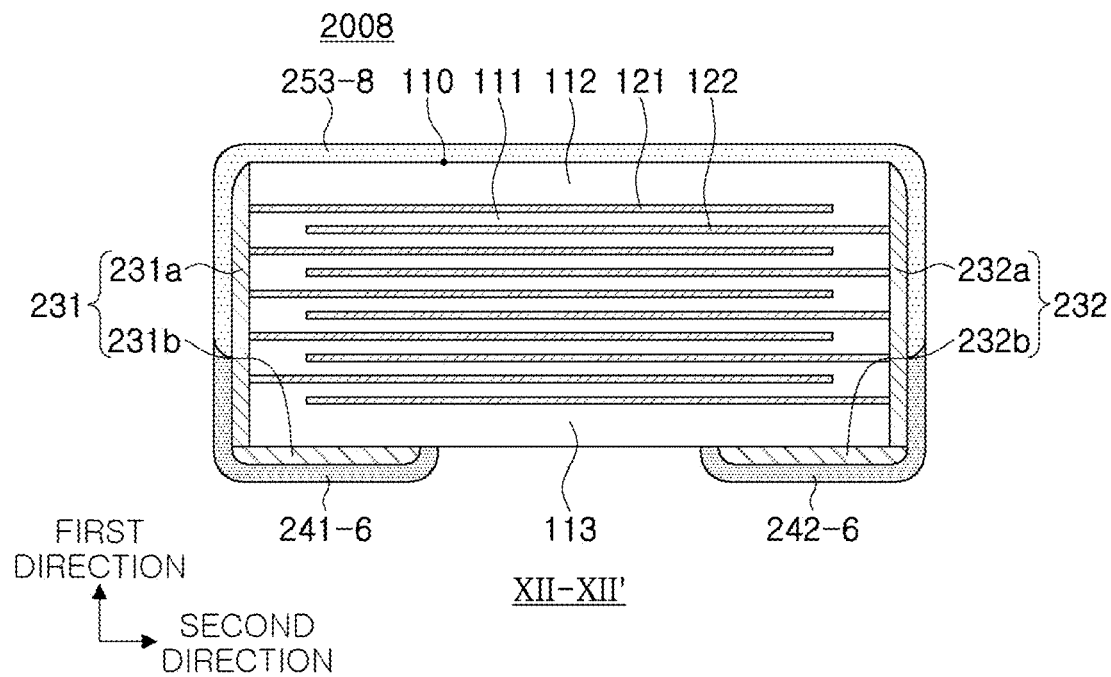
FIG. 32 is a cross-sectional view taken along line XII-XII' of FIG. 31.

FIG. 31 is a schematic perspective view of a multilayer electronic component 2008 according to an embodiment of the present disclosure. FIG. 32 is a cross-sectional view taken along line XII-XII' of FIG. 31.

Figure 33:
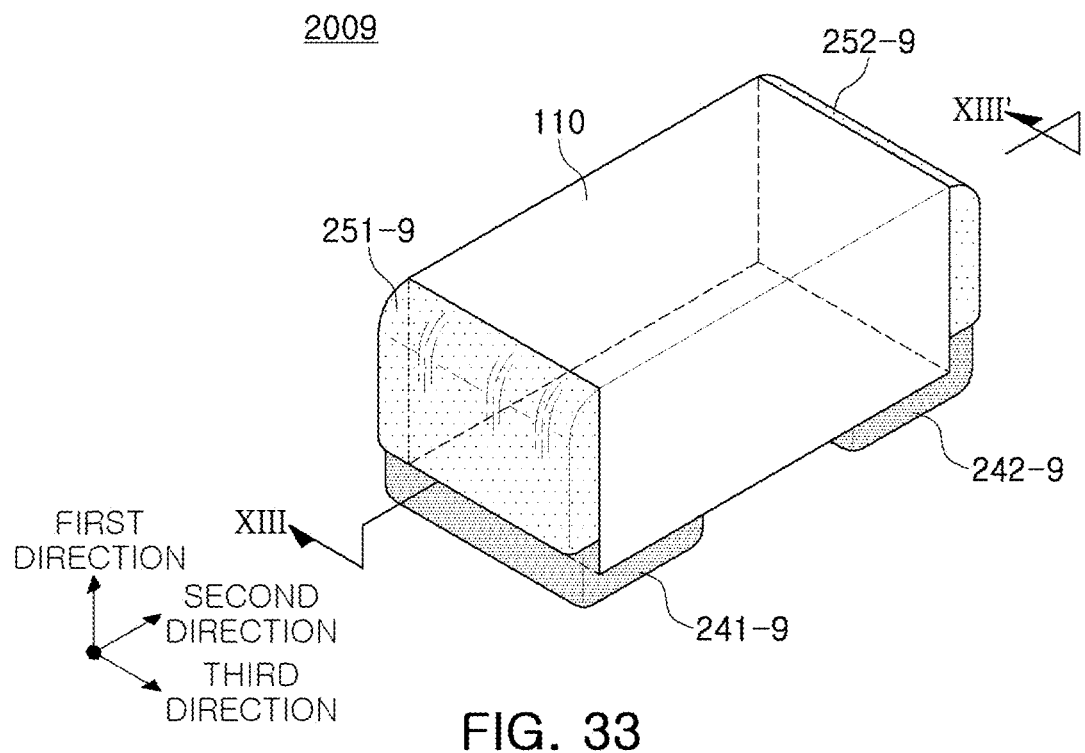
FIG. 33 is a schematic perspective view of a multilayer electronic component according to an embodiment of the present disclosure.

Referring to FIGS. 31 and 32, in a multilayer electronic component 2008 according to an embodiment of the present disclosure, first and second insulating layers 251-8 and 252-8 may extend to the second, fifth, and sixth surface 2, 5, and 6 and be connected to each other, so that they may be connected to one insulating layer 253-8. As illustrated in FIG. 33, the insulating layer 253-8 may entirely cover the second surface, and may only partially cover the fifth and sixth surfaces.

Figure 34:
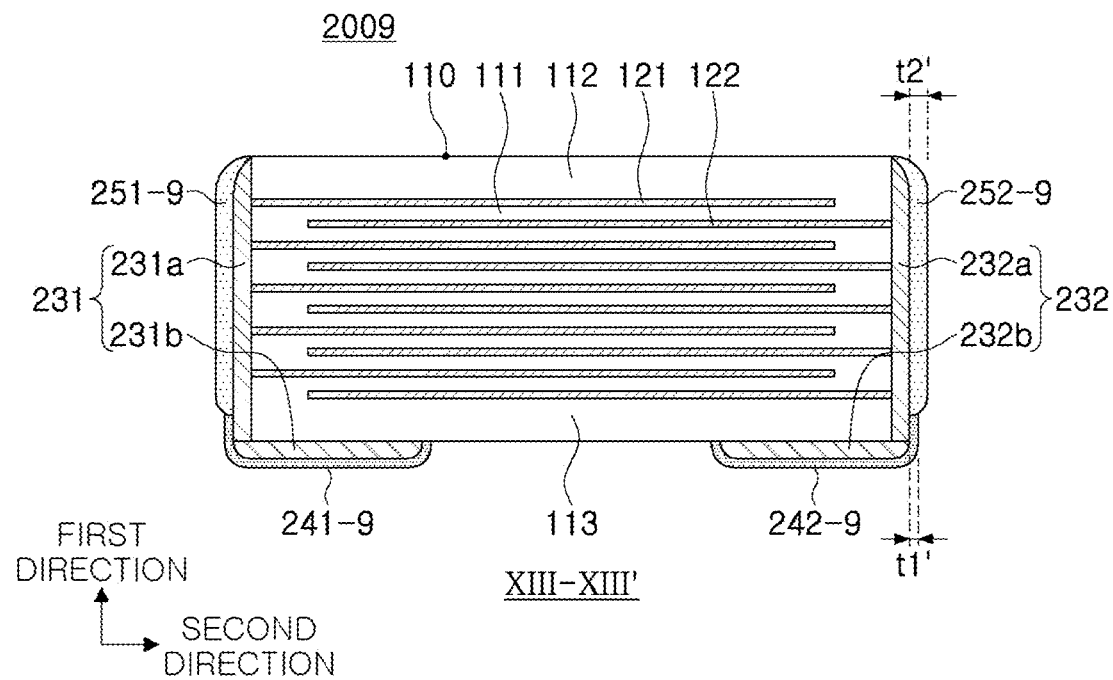
FIG. 34 is a cross-sectional view taken along line XIII-XIII' of FIG. 33.

FIG. 33 is a schematic perspective view of a multilayer electronic component 2009 according to an embodiment of the present disclosure. FIG. 34 is a cross-sectional view taken along line XIII-XIII of FIG. 33.

Figure 35:
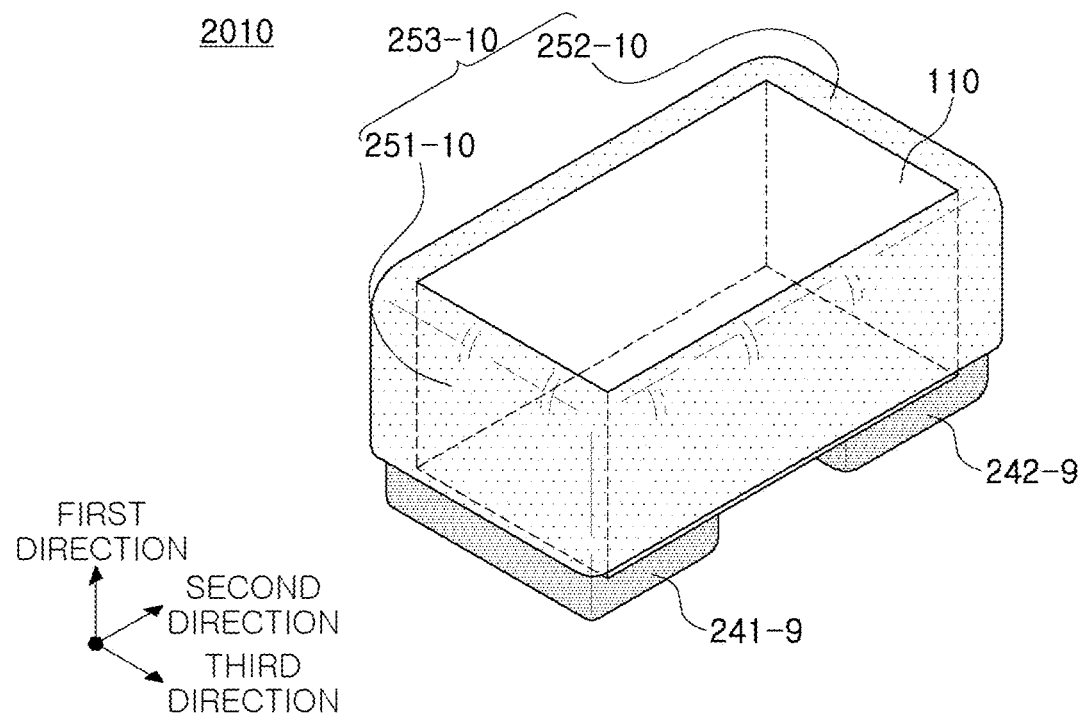
FIG. 35 illustrates a modified example of FIG. 33.
Figure 36:
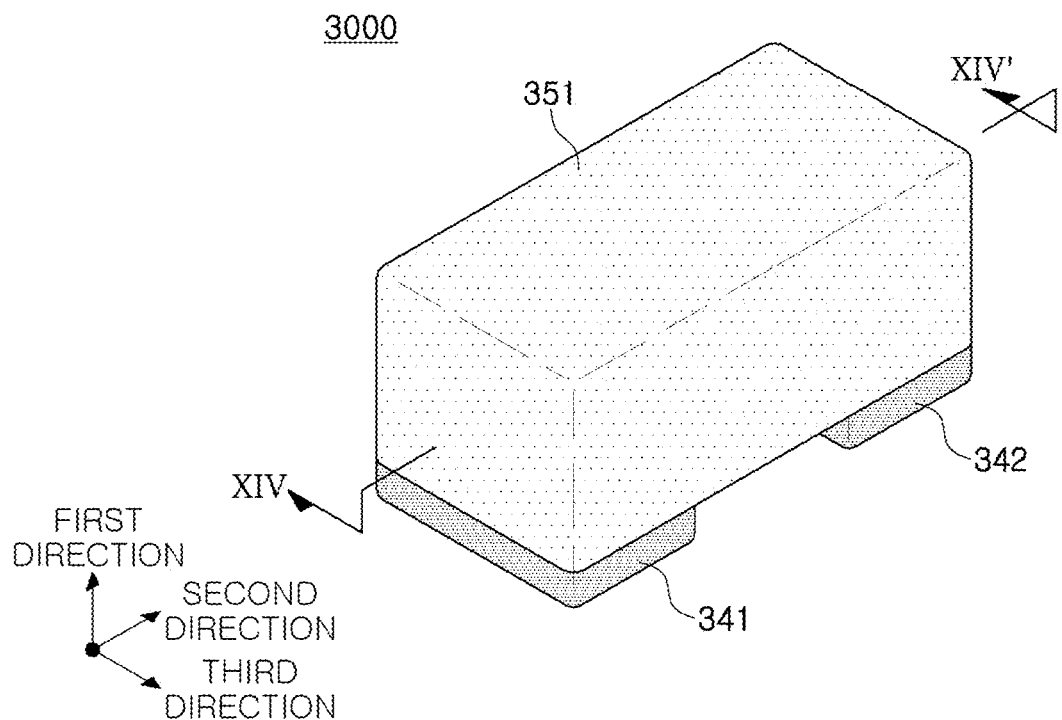
FIG. 36 is a schematic perspective view of a multilayer electronic component according to an embodiment of the present disclosure.

Referring to FIGS. 35 and 36, an average thickness "t1" of first and second plating layers 241-9 and 242-9 of the multilayer electronic component 2009 may be thinner than an average thickness "t2" of first and second insulating layers 251-9 and 252-9.

According to an embodiment of the present disclosure, the first and second plating layers 241-9 and 242-9 may be formed to have the average thickness "t1" thinner than the average thickness "t2" of the insulating layers 251-9 and 252-9, so that a contact area between the plating layers and the insulating layers may be reduced. Accordingly, by suppressing occurrence of delamination may be suppressed to improve adhesion strength to the substrate 180 of the multilayer electronic component 2009.

The average thickness "t1" of the first and second plating layers 241-9 and 242-9 may be a value obtained by averaging thicknesses measured at five points having equal intervals on the first and second plating layers 241-9 and 242-9 disposed on the first and second connection electrodes 231a and 232a, respectively, or on the first and second band electrodes 231b and 232b, respectively, and the average thickness "t2" of the insulating layers 251-9 and 252-9 may be a value obtained by averaging thicknesses measured at five points having equal intervals on the insulating layers 251-9 and 252-9 disposed on the first and second connection electrodes 231a and 232a, respectively. For example, the measurements may be taken by scanning the cross-section of the body 110 using a scanning electron microscope (SEM). Other methods and/or tools appreciated by one of ordinary skill in the art, even if not described in the present disclosure, may also be used.

FIG. 35 illustrates a modified example of FIG. 33. Referring to FIG. 35, in a modified example 2010 of a multilayer electronic component 2009 according to an embodiment of the present disclosure, first and second insulating layers 251-10 and 252-10 may extend to the fifth and sixth surfaces 5 and 6 and connected to each other so as to be connected to one insulating layer 253-10.

Figure 37:
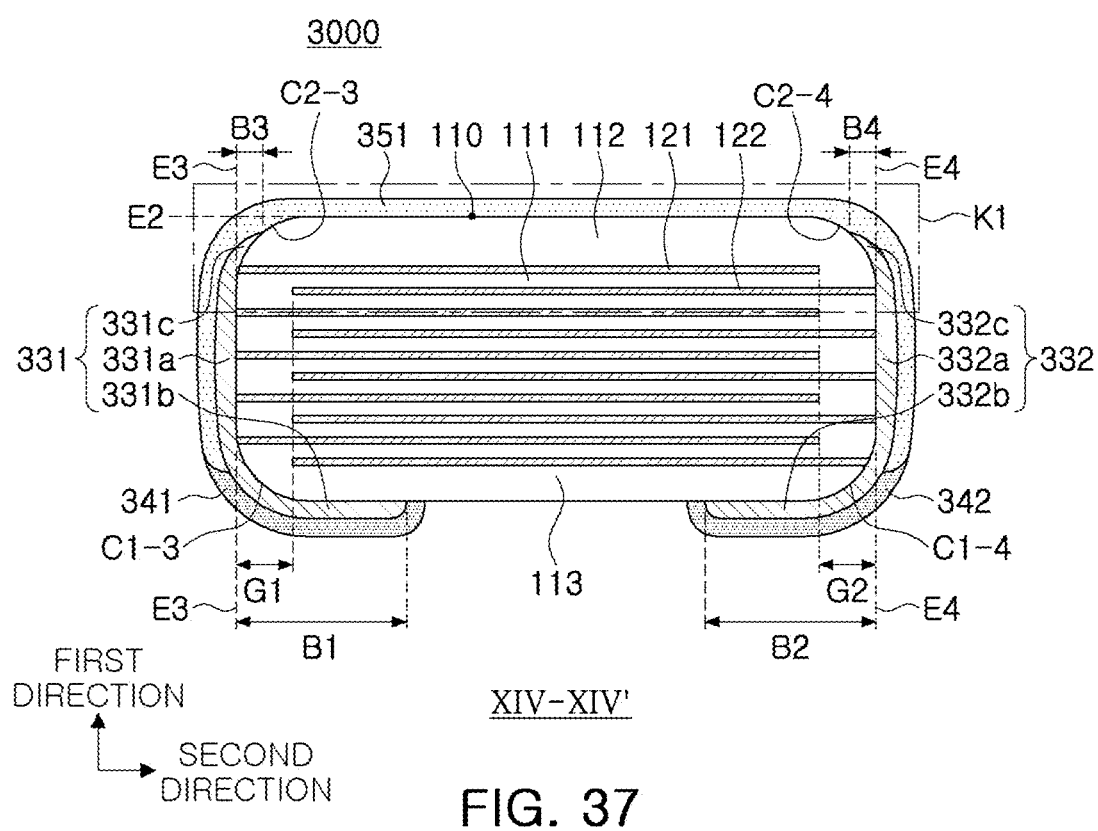
FIG. 37 is a cross-sectional view taken along line XIV-XIV' of FIG. 36.
Figure 38:
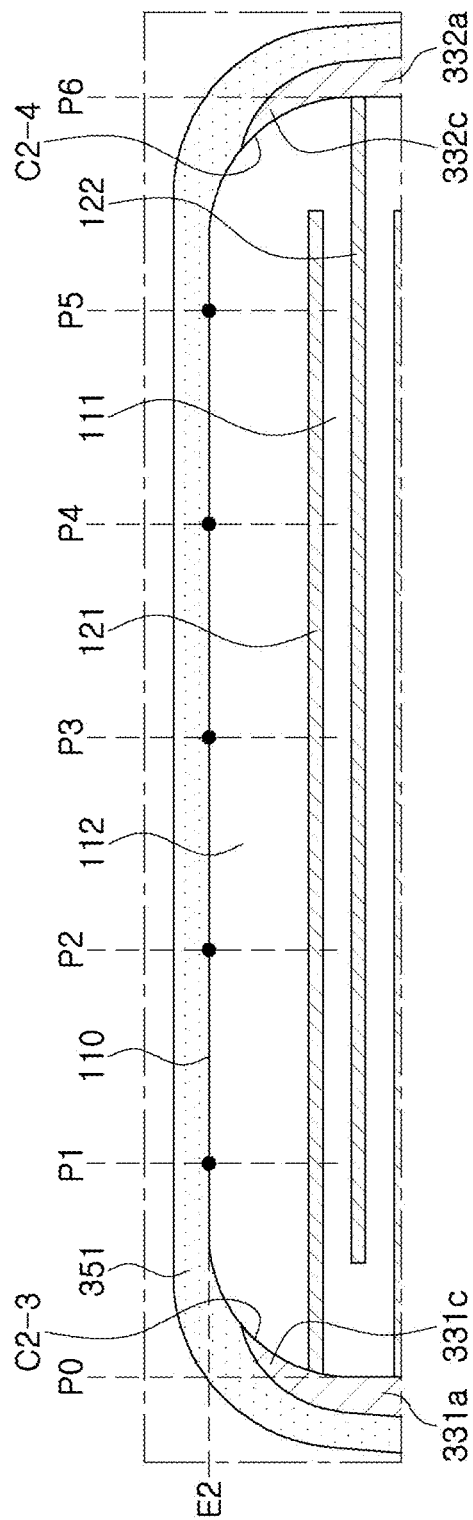
FIG. 38 is an enlarged view of region of K1 of FIG. 36.

FIG. 36 is a schematic diagram illustrating a perspective view of a multilayer electronic component 3000 according to an embodiment of the present disclosure. FIG. 37 is a cross-sectional view taken along line XIV-XIV' of FIG. 36. FIG. 38 is an enlarged view of region of K1 of FIG. 36.

Referring to FIGS. 36 to 42, a multilayer electronic component 3000 according to an embodiment of the present disclosure may include: a body 110 including a dielectric layer 111 and first and second internal electrodes 121 and 122 alternately disposed with the dielectric layer interposed therebetween, the body 110 having first and second surfaces opposing each other in a first direction, third and fourth surfaces connected to the first and second surfaces and opposing each other in a second direction, and fifth and sixth surfaces connected to the first to fourth surfaces and opposing each other in a third direction; a first external electrode 331 including a first connection portion 331a disposed on the third surface of the body, a first band portion 331b extending from the first connection portion onto a portion of the first surface, and a first corner portion 331c disposed to extend from the first connection portion to a corner connecting the second and third surfaces of the body; a second external electrode 332 including a second connection portion 332a disposed on the fourth surface of the body, a second band portion 332b extending from the second connection portion onto a portion of the first surface, and a second corner portion 332c disposed to extend from the second connection portion to a corner connecting the second and fourth surfaces of the body; an insulating layer 351 disposed on the first and second connection portions 331a and 332a, and disposed to cover the second surface, and the first and second corner portions; a first plating layer 341 disposed on the first band portion; and a second plating layer 342 disposed on the second band portion, wherein the first and second insulating layers may include a silicone-based resin (a first silicone-based resin).

In an embodiment, when an average distance from an extension line of the third surface to an end of the first corner portion 331c in the second direction is B3, an average distance from an extension line of the fourth surface to an end of the second corner portion 332c is B4, an average size of a region in which the third surface and the second internal electrode are spaced apart in a second direction is G1, and an average size of a region in which the fourth surface and the first internal electrode are spaced apart in a second direction is G2, B3≤G1 and B4≤G2 may be satisfied. Accordingly, a volume occupied by the external electrodes 331 and 332 may be minimized, to increase capacitance per unit volume of the multilayer electronic component 3000.

In this case, when an average distance from an extension line of the third surface to an end of the first band portion 331b in the second direction is B1, an average distance from an extension line of the fourth surface to an end of the second band portion 332b in the second direction is B2, B1≥G1 and B3≥G2 may be satisfied. Accordingly, by increasing an area in contact with a solder during mounting, the adhesion strength may be improved.

The multilayer electronic component 3000 according to an embodiment may include a body 110 including a dielectric layer r 111 and first and second internal electrodes 121 and 122 alternately disposed with the dielectric layer interposed therebetween, the body 110 having first and second surfaces opposing each other in a first direction, third and fourth surfaces connected to the first and second surfaces and opposing each other in a second direction, and fifth and sixth surfaces connected to the first to fourth surfaces and opposing each other in a third direction. The body 110 of the multilayer electronic component 3000 may have the same configuration as the body 110 of the multilayer electronic component 1000 except that an end portion of the first surface or the second surface has a contracted shape, as will be described later.

The external electrodes 331 and 332 may be disposed on the third surface 3 and the fourth surface 4 of the body 110. The external electrodes 331 and 332 may include first and second external electrodes 331 and 332 respectively disposed on the third and fourth surfaces 3 and 4 of the body 110, to be respectively connected to the first and second internal electrodes 121 and 122.

The external electrodes 331 and 332 may include a first external electrode 331 including a first connection portion 331a disposed on the third surface, a first band portion 331b extending from the first connection portion onto a portion of the first surface, and a first corner portion 331c disposed to extend from the first connection portion to a corner connecting the second and third surfaces, and a second external electrode 132 including a second connection portion 332a disposed on the fourth surface, a second band portion 332b extending from the second connection portion onto a portion of the first surface, and a second corner portion 332c disposed to extend from the second connection portion to a corner connecting the second and fourth surfaces. The first connection portion 331a may be connected to the first internal electrode 121 on the third surface, and the second connection portion 332a may be connected to the second internal electrode 122 on the fourth surface.

In an embodiment, the first and second connection portions 331a and 332a may be disposed to be spaced apart from the fifth and sixth surfaces. Accordingly, by minimizing a proportion of the external electrodes 331 and 332, the multilayer electronic component 3000 may be further miniaturized.

As a margin region in which the internal electrodes 121 and 122 are not disposed overlaps the dielectric layer 111, a step may be generated due a thickness of the internal electrodes 121 and 122, so that a corner connecting the first surface and the third to fifth surfaces and/or a corner connecting the second surface and the third to fifth surfaces may have a form contracted toward a center of the body 110, in the first direction when viewed with respect to the first surface or the second surface. Alternatively, a corner connecting the first surface 1 and the third to sixth surfaces 3, 4, 5, and 6 and/or a corner connecting the second surface 2 and the third to sixth surfaces 3, 4, 5, and 6 by shrinkage behavior in a sintering process of the body may have a form contracted toward the center of the body 110 in the first direction when viewed with respect to the first surface or the second surface. Alternatively, as a separate process is performed to round edges connecting each surface of the body 110 in order to prevent chipping defects, and/or the corner connecting the first surface and the third to sixth surfaces and/or the corner connecting the second surface and the third to sixth surfaces may have a rounded shape.

The corner may include a 1-3 corner (c1-3) connecting the first and third surface, a 1-4 corner (c1-4) connecting the first and fourth surfaces, a 2-3 corner (c2-3) connecting the second and third surfaces, and a 2-4 corner (c2-4) connecting the second and fourth surfaces. In addition, the corner may include a 1-5 corner connecting the first and fifth surfaces, a 1-6 corner connecting the first and sixth surfaces, a 2-5 corner connecting the second and fifth surfaces, and a 2-6 corner connecting the second and sixth surfaces. However, in order to suppress the step portion formed by the internal electrodes 121 and 122, after the internal electrodes are cut so as to be exposed to the fifth and sixth surfaces 5 and 6 of the body after lamination, when the margin portions 114 and 115 are formed by stacking a single dielectric layer or two or more dielectric layers on both side surfaces of the capacitance formation portion Ac in a third direction (width direction), a portion connecting the first surface and the fifth and sixth surfaces and a portion connecting the second surface and the fifth and sixth surfaces may not have a contracted form.

Meanwhile, the first to sixth surfaces of the body 110 may be generally flat surfaces, and a non-flat region thereof may be referred to as a corner portion. In addition, a region disposed on a corner of the external electrodes 131 and 132 may be referred to as a corner portion.

In this regard, the first and second corner portions 331c and 332c may be disposed below an extension line E2 of the second surface, and the first and second corner portions 331c and 332c may be disposed to be spaced apart from the second surface. That is, as the external electrodes 331 and 332 are not disposed on the second surface, a volume occupied by the external electrodes 331 and 332 may be further minimized, so that the volume occupied by the external electrodes 331 and 332 may be further minimized to further increase the capacitance per unit volume of the multilayer electronic component 3000. In addition, the first corner portion 331c may be disposed a portion of the 2-3 corner (C2-3) connecting the third surface and the second surface, and the second corner portion 332c may be disposed on a portion of the 2-4 corner (C2-4) connecting the fourth surface and the second surface.

The extension line E2 of the second surface may be defined as follows.

In cross-sections in length-thickness directions (L-T cross-sections) obtained by cutting the multilayer electronic component 3000 at a center thereof in a width direction, by drawing 7 straight lines P0, P1, P2. P3, P4, P5, P6, and P7 in a thickness direction having equal intervals in a length direction from the third surface to the fourth surface, a straight line passing a point at which P2 and the second surface meet and a point at which P4 and the second surface meet may be defined as an extension line E2 of the second surface.

Meanwhile, the external electrodes 331 and 332 may be formed using any material as long as they have electrical conductivity, such as metal, and a specific material may be determined in consideration of electrical characteristics and structural stability, and furthermore, may have a multilayer structure.

The external electrodes 331 and 332 may be firing electrodes including a conductive metal and glass, or resin-based electrodes including a conductive metal and glass.

In addition, the external electrodes 331 and 332 may have a form in which a firing electrode and a resin-based electrode are sequentially formed. In addition, the external electrodes 331 and 332 may be formed by transferring a sheet including a conductive metal onto the body, or may be formed by transferring a conductive metal onto the firing electrode.

As the conductive metal included in the external electrodes 331 and 332, a material having excellent electrical conductivity may be used, but is not particularly limited. For example, the conductive metal may be at least one of Cu, Ni, Pd, Ag, Sn, Cr, and alloys thereof. Preferably, the electrode layers 331 and 332 may include at least one of Ni and a Ni alloy, and accordingly, connectivity with the internal electrodes 121 and 122 including Ni can be further improved.

The insulating layer 351 may be disposed on first and second connection portions 331a and 332a.

Since the first and second connection portions 331a and 332a are portions connected to the internal electrodes 121 and 122, the first and second connection portions 131a and 132a may be paths for permeation of a plating solution in a plating process, or permeation of moisture during actual use. In the present disclosure, since the insulating layer 351 is disposed on the connection portions 331a and 332a, permeation of external moisture or permeation of the plating solution may be prevented.

The insulating layer 351 may be disposed to be in contact with the first and second plating layers 341 and 342. In this case, the insulating layer 351 may be in contact to partially cover ends of the first and second plating layers 341 and 342, or the first and second plating layers 341 and 342 may be in contact to partially cover an end of the insulating layer 351.

The insulating layer 353 may be disposed on the first and second connection portions 331a and 332a, and may be disposed to cover the second surface, and the first and second corner portions 331c and 332c. In addition, the insulating layer 351 may cover a region in which one ends of the first and second corner portions 331c and 332c and the body 110 are in contact, to block a moisture permeation path, thereby further improving moisture resistance reliability.

The insulating layer 351 may be disposed on the second surface to extend to the first and second connection portions 331a and 332a. In addition, when the external electrodes 331 and 332 are not disposed on the second surface, the insulating layer may be disposed to entirely cover the second surface. Meanwhile, the insulating layer 351 does not necessarily have to be disposed on the second surface, the insulating layer may not be disposed on a portion or an entirety of the second surface, and the insulating layer may be separated into two and respectively disposed on the first and second connection portions 331a and 332a. However, in this case, the insulating layer may be disposed to completely cover the first and second corner portions 331c and 332c. When the insulating layer is not disposed on the entirety of the second surface, the insulating layer may be disposed below an extension line of the second surface. In addition, although the insulating layer is not disposed on the second surface, it may extend from the first and second connection portions 331a and 332a to the fifth and sixth surfaces to form one insulating layer.

In an embodiment, the insulating layer 351 may be disposed to cover portions of the fifth and sixth surfaces to improve reliability. In this case, the portion of the fifth and sixth surfaces not covered by the insulating layer may be exposed externally.

Furthermore, the insulating layer 351 may be disposed to cover an entirety of the fifth and sixth surfaces, and in this case, the fifth and sixth surfaces thereof may not be exposed externally, improve moisture resistance reliability.

The insulating layer 351 may serve to prevent the plating layers 341 and 342 from being formed on the external electrodes 331 and 332 on which the insulating layer 351 is disposed, and improve sealing characteristics to serve to minimize permeation of moisture, a plating solution, or the like, from the outside. Since the components, composition, average thickness, and an effect thereof of the insulating layer 351 are the same as in the multilayer electronic components 1000 and 2000 to the insulating layers 151, 251, 252, and 253 including various embodiments thereof, the description thereof should be omitted.

The first plating layers 341 and 342 may be respectively disposed on the first and second band portions 331b and 332b. The plating layers 341 and 342 may serve to improve mounting characteristics, and as the plating layers 341 and 342 are disposed on the band portions 331b and 332b, a mounting space may be minimized, and reliability may be improved by minimizing permeation of a plating solution into an internal electrode, thereby improving reliability. One end of the first and second plating layers 341 and 342 may be in contact with the first surface, and the other end may be in contact with the insulating layer 351.

The type of the plating layers 341 and 342 is not particularly limited, and may be a plating layer including at least one of Cu, Ni, Sn, Ag, Au, Pd, and alloys thereof, and may be formed of a plurality of layers.

As a more specific example of the plating layers 341 and 342, the plating layers 341 and 342 may be a Ni plating layer or a Sn plating layer, and may have a form in which a Ni plating layer and a Sn plating layer are sequentially formed on the first and second band portions 331b and 332b.

In an embodiment, the insulating layer 351 may be disposed to be in direct contact with first and second external electrodes 331 and 332, and the first and second external electrodes 331 and 332 may include a conductive metal and glass. Accordingly, since the plating layers 341 and 342 may not be disposed in a region in which the insulating layer 351 is disposed among outer surfaces of the first and second external electrodes 331 and 332, erosion of the external electrodes by a plating solution may be effectively suppressed.

In an embodiment, the insulating layer 351 may be disposed to be in direct contact with first external electrodes 331 and 332, and the first and second external electrodes 331 and 332 may include a conductive metal and glass. Accordingly, since the plating layers 341 and 342 may not be disposed in a region in which the insulating layer 351 is disposed among outer surfaces of the first and second external electrodes 331 and 332, erosion of the external electrodes by a plating solution may be effectively suppressed.

In an embodiment, the first plating layer 341 may be disposed to cover an end disposed on the first external electrode 331 of the insulating layer 351, and the second plating layer 342 may be disposed to cover an end disposed on the second external electrode 332 of the insulating layer 351. Accordingly, reliability of the multilayer electronic component 3000 may be improved by strengthening the bonding strength between the insulating layer 351 and the plating layers 341 and 342. In addition, by forming the insulating layer 351 first before forming the plating layers 341 and 342 on the external electrodes 331 and 332, permeation of the plating solution in a process of forming the plating layer may be more reliably suppressed. As the insulating layer is formed before the plating layer, it may have a shape in which the plating layers 341 and 342 cover an end of the insulating layer 351.

In an embodiment, the insulating layer 351 may be disposed to cover an end disposed on the first external electrode 331 of the first plating layer 341, and the insulating layer 351 may be disposed to cover an end disposed on the second external electrode 332 of the second plating layer 342. Accordingly, the reliability of the multilayer electronic component 3000 may be improved by strengthening bonding strength between the insulating layer 351 and the plating layers 341 and 342.

In an embodiment, the first and second plating layers 341 and 342 may be disposed to extend to partially cover the first and second connection portions 331a and 332a, respectively. When an average size disposed to be closest to a first surface 1, among the first and second internal electrodes 121 and 122, is H1, and an average distance from an extension line of the first surface 1 to an end of the first and second plating layers 141 and 142 disposed on the first and second connection portions 131a and 132a in a first direction is H2, H1>H2 may be satisfied. Accordingly, it is possible to suppress permeation of a plating solution into the internal electrode during the plating process, thereby improving reliability.

In an embodiment, when an average distance from the first surface to an internal electrode of the first and second internal electrodes 121 and 122 disposed closest to the first surface in a first direction is H1, and an average distance from an extension line of the first surface to an end of the plating layers 341 and 342 disposed on the first and second connection portions 331a and 332a in a first direction is H2, H1<H2 may be satisfied. Accordingly, by increasing an area in contact with a solder during mounting, the adhesion strength may be improved. More preferably, when the average size of the body 110 in the first direction is T, H2<T/2 may be satisfied. That is, H1<H2<T/2 may be satisfied. That is because there is a possibility that a moisture-resistance reliability improvement effect by an insulating layer may be reduced when H2 is T/2 or more.

In an embodiment, the first and second plating layers 341 and 342 may be disposed below an extension line of the first surface. Accordingly, a height of the solder during mounting may be minimized and a mounting space may be minimized. In addition, the insulating layer 351 may extend on a level the same as or lower than a level of an extension line of the first surface and may be disposed to be in contact with the first and second plating layers 341 and 342.

In an embodiment, when an average size of the body in a second direction is L, an average distance from an extension line of the third surface to an end of the first band portion in the second direction is B1, and an average distance from an extension line of the fourth surface to an end of the second band portion in the second direction is B2, $0.2 \leq B1/L \leq 0.4$ and $0.2 \leq B2/L \leq 0.4$ may be satisfied.

When B1/L and B2/L are less than 0.2, it may be difficult to secure sufficient adhesion strength. On the other hand, when B2/L exceeds 0.4, there is a concern that a leakage current may be generated between the first band portion 331b and the second band portion 332b under a high-voltage current, and there is a concern that the first band portion 331b and the second band portion 332b may be electrically connected.

In an embodiment, an additional insulating layer disposed on the first surface and disposed between the first band portion 331b and the second band portion 332b may be further included. Accordingly, it is possible to prevent a leakage current, or the like, that may occur between the first band portion 331b and the second band portion 332b under a high voltage current.

The type of the additional insulating layer does not need to be particularly limited. For example, the additional insulating layer may include a silicone-based resin (a second silicone-based resin), like the insulating layer 351. However, it is not necessary to limit the additional insulating layer and the insulating layer 351 to the same material, and may be formed of different materials. For example, the additional insulating layer may include at least one selected from an epoxy resin, an acrylic resin, ethyl cellulose, or the like, or may include glass.

In an embodiment, when an average distance from an extension line of the third surface to an end of the first band portion in the second direction is B1, and an average distance from an extension line of the fourth surface to an end of the second band portion in the second direction is B2, B3<B1 and B4<B2 may be satisfied. An average length B1 of the first band portion 331b may be longer than an average length B3 of the first corner portion 331c, and an average length of the second band portion 332b may be longer than an average length B4 of the second corner portion 332c. Accordingly, by increasing an area in contact with a solder during mounting, adhesion strength may be improved.

In more detail, when an average distance from an extension line of the third surface 3 to an end of the first band portion 331b in the second direction is B1, an average distance from an extension line of the fourth surface 4 to an end of the second band portion 332b in the second direction is B2, an average distance from the extension line of the third surface 3 to an end of the first corner portion 331c in the second direction is B3, and an average distance from the extension line of the fourth surface 4 to an end of the second corner portion 332c in the second direction is B4, B3<B1 and B4<B2 may be satisfied.

In an embodiment, an average thickness of the first and second plating layers 341 and 342 may be thinner than an average thickness of the insulating layer 351.

The insulating layer 351 may serve to prevent permeation of external moisture or permeation of a plating solution, but may have weak connectivity to plating layers 341 and 342, to cause of delamination of the plating layers. When the plating layer is delaminated, adhesion strength to the substrate 180 may be reduced. Here, the delamination of the plating layers 341 and 342 may mean that a plating layer is partially separated or is physically separated from the external electrodes 331 and 332. Since the connectivity between the plating layer and the insulating layer is weak, there is a high possibility that a gap at an interface between the insulating layer and the plating layer may be increased or foreign substances may permeate through the gap, and there is a high possibility that the plating layer may be delaminated due to vulnerability to external impact, or the like.

According to an embodiment of the present disclosure, by making an average thickness of the plating layer thinner than an average thickness of the insulating layer, an area in which the plating layer and the insulating layer are in contact may be reduced, and accordingly, occurrence of delamination may be suppressed to improve adhesion strength thereof to the multilayer electronic component 3000.

A size of the multilayer electronic component 3000 needs not be particularly limited.

However, in order to achieve miniaturization and high capacitance at the same time, since it is necessary to increase the number of stacked layers by reducing the thickness of the dielectric layer and the internal electrodes, in the multilayer electronic component 3000 having a size of 1005 (a length×a width, 1.0 mm×0.5 mm) or less, an effect of improving reliability and capacitance per unit volume according to the present disclosure may be more remarkably improved.

Accordingly, when a length of the multilayer electronic component 3000 is 1.1 mm or less and a width is 0.55 mm or less, considering manufacturing errors and sizes of external electrodes, and the like, a reliability improvement effect according to the present disclosure may be more remarkably improved. Here, the length of the multilayer electronic component 3000 may refer to a size of the multilayer electronic component 3000 in the second direction, and the width of the multilayer electronic component 3000 may refer to a size of the multilayer electronic component 3000 in the third direction.

As set forth above, as one of the various effects of the present disclosure, an insulating layer may be disposed on a connection portion of an external electrode, and a plating layer may be disposed on a band portion of the external electrode, so that reliability may be improved while improving capacitance per unit volume of the multilayer electronic component.

As one of the various effects of the present disclosure, a mounting space of the multilayer electronic component may be minimized.

As one of the various effects of the present disclosure, an insulating layer may include a silicone-based resin, thereby preventing permeation of moisture and a plating solution to improve moisture resistance reliability, and suppressing crack generation and propagation.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of at least one of the associated listed items. It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

However, various and advantageous advantages and effects of the present disclosure are not limited to the above description, and will be more readily understood in the process of describing specific embodiments of the present disclosure.

While example embodiments have been shown and described above, it will be apparent to those skilled in the art that modifications and variations could be made without departing from the scope of the present disclosure as defined by the appended claims.

While the exemplary embodiments have been shown and described above, it will be apparent to those skilled in the art that modifications and variations could be made without departing from the scope of the present invention as defined by the appended claims.

What is claimed is:

1. A multilayer electronic component, comprising:
a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, fifth and sixth surfaces connected to the first to fourth surfaces and opposing each other in a third direction;
a first external electrode including a first connection portion disposed on the third surface, and a first band portion extending from the first connection portion onto a first portion of the first surface;
a second external electrode including a second connection portion disposed on the fourth surface, and a second band portion extending from the second connection portion onto a second portion of the first surface;
an insulating layer including a first insulating layer disposed on the first connection portion and a second insulating layer disposed on the second connection portion, the insulating layer includes a first silicone-based resin;

a first plating layer disposed on the first band portion and extends to an end portion of the first insulating layer disposed on the first connection portion; and a second plating layer disposed on the second band portion and extends to an end portion of the second insulating layer disposed on the second connection portion, wherein H1<H2, where H1 is an average distance from the first surface to an internal electrode, disposed to be closest to the first surface, among the first and second internal electrodes, in the first direction, and H2 is an average distance from an extension line of the first surface to an end of the first plating layer disposed on the first connection portion or to an end of the second plating layer disposed on the second connection portion in the first direction.

2. The multilayer electronic component of claim 1, wherein the silicone-based resin comprises a siloxane bond in which a silicon (Si) atom and an oxygen (O) atom are bonded.

3. The multilayer electronic component of claim 1, wherein the silicone-based resin comprises a methyl group ($-CH_3$).

4. The multilayer electronic component of claim 1, wherein the insulating layer further comprises at least one selected from a group consisting of $TiO_2$, $BaTiO_3$, $Al_2O_3$, $SiO_2$, and $BaO$.

5. The multilayer electronic component of claim 1, wherein H2<T/2, where T is an average size of the body in the first direction.

6. The multilayer electronic component of claim 1, wherein the first and second plating layers are disposed on a level the same as or lower than a level of an extension line of the first surface.

7. The multilayer electronic component of claim 1, wherein $0.2 \leq B1/L \leq 0.4$ and $0.2 \leq B2/L \leq 0.4$, where L is an average size of the body in the second direction, B1 an average distance from an extension line of the third surface to a distal end of the first band portion in the second direction, and B2 is an average distance from an extension line of the fourth surface to a distal end of the second band portion in the second direction.

8. The multilayer electronic component of claim 1, further comprising:

an additional insulating layer disposed on the first surface and disposed between the first band portion and the second band portion.

9. The multilayer electronic component of claim 1, wherein at least one of the dielectric layers has an average thickness of 0.35 μm or less.

10. The multilayer electronic component of claim 1, wherein the first and second internal electrodes have an average thickness of 0.35 μm or less.

11. The multilayer electronic component of claim 1, wherein the body includes a capacitance formation portion, including the first and second internal electrodes, alternately disposed with the dielectric layers interposed therebetween, and cover portions, respectively disposed on opposite end surfaces of the capacitance formation portion in the first direction, and an average size of the cover portion in the first direction is 15 μm or less.

12. The multilayer electronic component of claim 1, wherein an average thickness of at least one of the first and second plating layers is smaller than an average thickness of the insulating layer.

13. The multilayer electronic component of claim 1, wherein the first plating layer is disposed to cover the end of the first insulating layer close to the first surface, and the second plating layer is disposed to cover the end of the second insulating layer close to the first surface.

14. The multilayer electronic component of claim 1, wherein the first insulating layer is disposed to cover an end of the first plating layer disposed on the first external electrode, and the second insulating layer is disposed to cover an end of the second plating layer disposed on the second external electrode.

15. The multilayer electronic component of claim 1, wherein the first external electrode includes a first side band portion extending from the first connection portion onto portions of the fifth and sixth surfaces, the second external electrode includes a second side band portion extending from the second connection portion onto portions of the fifth and sixth surfaces, and a size of each of the first and second band portions in the second direction is increased in a direction toward the first surface.

16. The multilayer electronic component of claim 1, wherein the first and second external electrodes are disposed to be spaced apart from the fifth and sixth surfaces.

17. The multilayer electronic component of claim 1, wherein the first and second external electrodes are disposed to be spaced apart from the second surface.

18. The multilayer electronic component of claim 1, wherein the first and second insulating layers extend to the second surface to be connected to each other.

19. The multilayer electronic component of claim 1, wherein the first and second insulating layers extend to the fifth and sixth surfaces to be connected to each other.

20. The multilayer electronic component of claim 1, wherein the first and second insulating layers are not disposed on the second, fifth and sixth surfaces.

21. The multilayer electronic component of claim 1, wherein the first external electrode further includes a third band portion extending from the first connection portion onto a portion of the second surface, and the second external electrode further includes a fourth band portion extending from the second connection portion onto a portion of the second surface.

22. The multilayer electronic component of claim 1, wherein the body has a 1-3-th corner connecting the first and third surfaces to each other, a 1-4-th corner connecting the first and fourth surfaces to each other, a 2-3-th corner connecting the second and third surfaces, and a 2-4-th corner connecting the second and fourth surfaces to each other, the 1-3-th corner and the 2-3-th corner have a form contracted to a center of the body in the first direction, in a direction toward the third surface, and the 1-4-th corner and the 2-4-th corner are contracted to the center of the body in the first direction, in a direction toward the fourth surface, and the first external electrode includes a first corner portion disposed to extend upwardly of the 1-3-th corner and the 2-3-th corner, and the second external electrode includes a second corner portion disposed to extend upwardly of the 1-4-th corner and the 2-4-th corner.

23. The multilayer electronic component of claim 22, wherein $B3 \leq G1$ and $B4 \leq G2$, where B3 is an average distance from an extension line of the third surface to a distal end of the first corner portion in the second direction, B4 is an average distance from an extension line of the fourth surface to a distal end of the second corner portion in the second direction, G1 is an average size of a region, in which the third surface and the second internal electrode are spaced apart from each other, in the second direction, and G2 is an average size of a region, in which the fourth surface and the first internal electrode are spaced apart from each other, in the second direction.

24. The multilayer electronic component of claim 1, wherein
the first external electrode includes a first connection electrode, disposed on the third surface, and a first band electrode disposed on the first surface to be connected to the first connection electrode, and
the second external electrode includes a second connection electrode, disposed on the fourth surface, and a second band electrode disposed on the first surface to be connected to the second connection electrode.

25. The multilayer electronic component of claim 24, wherein the first and second connection electrodes are disposed to be spaced apart from the fifth and sixth surfaces.

26. The multilayer electronic component of claim 24, wherein the first and second connection electrodes are disposed to be spaced apart from the second surface.

27. The multilayer electronic component of claim 24, wherein the first external electrode further includes a third band electrode disposed on the second surface to be connected to the first connection electrode, and
the second external electrode further includes a fourth band electrode disposed on the second surface to be connected to the second connection electrode.

28. The multilayer electronic component of claim 24, wherein the first and second connection electrodes include the same metal as a metal included in the first and second internal electrodes.

29. The multilayer electronic component of claim 24, wherein each of the first and second band electrodes is a fired electrode including a conductive metal and glass.

30. The multilayer electronic component of claim 24, wherein each of the first and second connection electrodes is a fired electrode including a conductive metal and glass.

31. The multilayer electronic component of claim 24, wherein each of the first and second band electrodes is a plating layer.

32. The multilayer electronic component of claim 24, wherein each of the first and second connection electrodes is a plating layer.

33. A multilayer electronic component, comprising:
a body including a dielectric layer and first and second internal electrodes alternately disposed with the dielectric layer interposed therebetween, the body having first and second surfaces opposing each other in a first direction, third and fourth surfaces connected to the first and second surfaces and opposing each other in a second direction, fifth and sixth surfaces connected to the first to fourth surfaces and opposing each other in a third direction;
a first external electrode including a first connection portion disposed on the third surface, and a first band portion extending from the first connection portion onto a first portion of the first surface;
a second external electrode including a second connection portion disposed on the fourth surface, and a second band portion extending from the second connection portion onto a second portion of the first surface;
an insulating layer including a first insulating layer disposed on the first connection portion and a second insulating layer disposed on the second connection portion, the insulating layer includes a first silicone-based resin;
a first plating layer disposed on the first band portion; and
a second plating layer disposed on the second band portion,
wherein, an average distance from the first surface to an internal electrode, disposed to be closest to the first surface, among the first and second internal electrodes, in the first direction, is H1, an average distance from an extension line of the first surface to an end of the first plating layer disposed on the first connection portion or to an end of the second plating layer disposed on the second connection portion, in the first direction, is H2, and H1<H2 is satisfied, and
wherein, an average size of the body in the first direction is T, H2 and T satisfy H2<T/2.

* * * * *